(12) United States Patent
Moore et al.

(10) Patent No.: US 12,491,953 B2
(45) Date of Patent: Dec. 9, 2025

(54) AUTOMATIC TRACTOR TRAILER COUPLING

(71) Applicant: ISEE, Inc., Cambridge, MA (US)

(72) Inventors: Frederick M. Moore, Somerville, MA (US); Gregory J. Paraskos, Medford, MA (US)

(73) Assignee: ISEE, Inc., Cambridge, MA (US)

( * ) Notice: Subject to any disclaimer, the term of this patent is extended or adjusted under 35 U.S.C. 154(b) by 982 days.

(21) Appl. No.: 17/592,038

(22) Filed: Feb. 3, 2022

(65) Prior Publication Data

US 2022/0227435 A1    Jul. 21, 2022

Related U.S. Application Data

(63) Continuation of application No. PCT/US2022/011854, filed on Jan. 10, 2022.

(60) Provisional application No. 63/205,667, filed on Jan. 10, 2021.

(51) Int. Cl.
*B62D 53/12* (2006.01)
*B62D 53/08* (2006.01)

(52) U.S. Cl.
CPC ....... *B62D 53/125* (2013.01); *B62D 53/0842* (2013.01)

(58) Field of Classification Search
CPC .................... B62D 53/125; B62D 53/0842
See application file for complete search history.

(56) References Cited

U.S. PATENT DOCUMENTS

| 5,346,239 A | * | 9/1994 | Wohlhuter | ........... B62D 53/125 |
| | | | | 280/422 |
| 2020/0086703 A1 | * | 3/2020 | Johnson | ............... B62D 53/125 |

* cited by examiner

*Primary Examiner* — Jacob D Knutson
(74) *Attorney, Agent, or Firm* — Brian M. Dingman; Prince Lobel Tye LLP

(57) ABSTRACT

A system for automatically coupling the air and electrical lines of a tractor to a trailer. A trailer coupling head is mounted to the trailer and carries air line and electrical connectors. A fifth wheel coupling height control system is configured to automatically control the height of the tractor's fifth wheel coupling, to control the height of the trailer coupling head. A tractor coupling head carries air line and electrical connectors that are configured to be operably coupled to the mating connectors of the trailer coupling head. A tractor coupling head carrier removably carries the tractor coupling head. A tractor coupling head carrier control system moves the tractor coupling head carrier toward and away from the trailer coupling head along a longitudinal axis. The tractor coupling head can be clamped to and carried by the tractor coupling head carrier or the tractor coupling head can be clamped to the trailer coupling head.

20 Claims, 23 Drawing Sheets

AUTOMATIC TRACTOR TRAILER COUPLING

CROSS-REFERENCE TO RELATED APPLICATIONS

This application claims priority of application PCT/US22/11854 filed on Jan. 10, 2022, which itself claimed priority of Provisional Application 63/205,667 filed on Jan. 10, 2021.

BACKGROUND

This disclosure relates to coupling a tractor to a trailer.

Trailers are frequently docked or coupled, and undocked or uncoupled, from tractors in cargo yards, warehouse facilities, and intermodal facilities. The docking and unlocking operations require human intervention, making them relatively expensive and time consuming.

SUMMARY

The automatic tractor trailer coupling system and method involves a tractor coupling head that is movably carried by the tractor, and a trailer coupling head that is carried by the trailer. The heads include devices that are used to couple air lines of the tractor to air lines of the trailer, such as lines for braking and emergency braking. Additionally or alternatively the heads include devices that are used to couple electrical lines of the tractor to the trailer, such as electrical signals that are used for trailer running and braking lights.

All examples and features mentioned below can be combined in any technically possible way.

In one aspect, a system for automatically coupling at least one of an air line or an electrical line of a tractor to a trailer that is configured to be pulled by the tractor, wherein the tractor comprises a fifth wheel coupling that is configured to be coupled to a kingpin of the trailer, wherein a height of the fifth wheel coupling is adjustable, includes a trailer coupling head mounted to the trailer and that comprises at least one of an air line connector or an electrical connector, a fifth wheel coupling height control system that is configured to automatically control the height of the fifth wheel coupling when it is coupled to the kingpin of the trailer, to control the height of the trailer coupling head, a tractor coupling head that comprises at least one of an air line connector that is configured to be operably coupled to an air line connector of the trailer coupling head or an electrical connector that is configured to be operably coupled to an electrical connector of the trailer coupling head, a tractor coupling head carrier that is configured to removably carry the tractor coupling head, a tractor coupling head carrier control system that is configured to move the tractor coupling head carrier toward and away from the trailer coupling head along a longitudinal axis, and a clamping mechanism carried by the tractor coupling head and configured to establish at least two alternative clamping states, one clamping state where the tractor coupling head is clamped to and carried by the tractor coupling head carrier such that the tractor coupling head is moved as the tractor coupling head carrier is moved, and a second clamping state where the tractor coupling head is clamped to the trailer coupling head such that the tractor coupling head carrier is free to move relative to the tractor coupling head.

Some examples include one of the above and/or below features, or any combination thereof. In an example the trailer coupling head comprises mechanical features that are configured to engage with mechanical features of the tractor coupling head to provide for motions of the trailer coupling head along a vertical axis that is orthogonal to the longitudinal axis, and motions of the tractor coupling head along a transverse axis that is orthogonal to both the vertical axis and the longitudinal axis. In an example the tractor further comprises an adjustable-angle boom that carries the fifth wheel coupling, and the fifth wheel coupling height control system comprises a first sensor that senses the boom angle, a second sensor that senses an angle of the fifth wheel coupling, and a controller that is configured to automatically control the height of the fifth wheel coupling based on the sensed boom angle and the sensed fifth wheel coupling angle. In an example the tractor coupling head carrier control system comprises a single degree of freedom linear actuator carried by the tractor and configured to move the tractor coupling head carrier toward and away from the trailer along the longitudinal axis. In an example the tractor coupling head further comprises mechanical features that are configured to engage with features of the trailer coupling head to align the tractor coupling head with the trailer coupling head by providing for motions of the trailer coupling head along a vertical axis that is orthogonal to the longitudinal axis, and motions of the tractor coupling head along a transverse axis that is orthogonal to both the vertical axis and the longitudinal axis.

Some examples include one of the above and/or below features, or any combination thereof. In some examples the system further includes a trailer coupling frame that carries at least one extending magnetic member that is constructed and arranged to removably couple to an underside of the trailer and thereby couple the trailer coupling frame to the trailer, wherein the trailer coupling head is supported by the trailer coupling frame. In an example the system further includes a flexure between the trailer coupling head and the trailer coupling frame, wherein the flexure is constructed and arranged to provide vertical compliance of the trailer coupling head relative to the trailer. In an example the flexure is more compliant in one vertical direction than it is in the other vertical direction. In an example the flexure is further constructed and arranged to provide rotational compliance of the trailer coupling head relative to the trailer about the longitudinal axis. In an example the system further includes a pair of air lines and an electrical line that are coupled to the trailer coupling head, and a strain relief and support mechanism carried by the trailer coupling frame and that supports the air lines and the electrical line, wherein the strain relief and support mechanism comprises a differentially flexible support structure that is more flexible in the transverse direction than it is in the longitudinal direction.

Some examples include one of the above and/or below features, or any combination thereof. In some examples the tractor coupling head carrier includes a linkage mechanism that is configured to allow the tractor coupling head to move along a transverse axis that is orthogonal to the longitudinal axis, and to rotate about a vertical axis that is orthogonal to both the longitudinal axis and the transverse axis. In an example the linkage mechanism comprises a four-bar linkage mechanism. In an example the four-bar linkage mechanism comprises a fixed link, two grounded links that are pivotably coupled to the fixed link, and a floating link that is pivotably coupled to both grounded links. In an example the tractor coupling head is removably coupled to the floating link. In an example the floating link comprises opposed inwardly-angled funnel surfaces that are configured to engage with a mechanical feature of the trailer coupling head to provide for motion of the tractor coupling head along the transverse axis. In an example the floating link comprises opposed upwardly-angled ramp surfaces that are configured to engage with a mechanical feature of the trailer coupling head to provide for motion of the trailer coupling head along the vertical axis. In an example the tractor coupling head carrier further comprises a mechanical feature that is configured to engage with a centering funnel of the tractor as the tractor coupling head carrier is moved along the longitudinal axis away from the trailer coupling head toward the tractor to a home position relative to the tractor.

Some examples include one of the above and/or below features, or any combination thereof. In an example the clamping mechanism comprises a clamping arm configuration that alternately clamps to the tractor coupling head carrier and the trailer coupling head. In an example the trailer coupling head comprises a trailer coupling head face with opposed ends and that carries two air seals and an electrical connector between the opposed ends, and the tractor coupling head comprises a tractor coupling head face with opposed ends and that carries two air seals and an electrical connector between the opposed ends, wherein the air seals and electrical connectors of the two faces are configured to mate together when the tractor coupling head is clamped to the trailer coupling head. In an example the clamping arm configuration comprises two sets of clamping arms, one set proximate one end of the tractor coupling head face and the other set proximate the other end of the tractor coupling head face, and each set comprises a first arm that is configured to lock to the tractor coupling head carrier and a second arm that is configured to lock to the trailer coupling head, and the clamping mechanism further comprises a rotary motor that is configured to move at least one set of clamping arms.

In another aspect, a system for automatically coupling at least one of an air line or an electrical line of a tractor to a trailer that is configured to be pulled by the tractor, wherein the tractor comprises a fifth wheel coupling that is configured to be coupled to a kingpin of the trailer and an adjustable-angle boom that carries the fifth wheel coupling, wherein a height of the fifth wheel coupling is adjustable, includes a trailer coupling head mounted to the trailer and that comprises at least one of an air line connector or an electrical connector, a trailer coupling frame that carries at least one extending magnetic member that is constructed and arranged to removably couple to an underside of the trailer and thereby couple the trailer coupling frame to the trailer, wherein the trailer coupling head is supported by the trailer coupling frame, a flexure between the trailer coupling head and the trailer coupling frame, wherein the flexure is constructed and arranged to provide vertical compliance of the trailer coupling head relative to the trailer, wherein the flexure is more compliant in one vertical direction than it is in the other vertical direction, and wherein the flexure is further constructed and arranged to provide rotational compliance of the trailer coupling head relative to the trailer about a longitudinal axis, a fifth wheel coupling height control system that is configured to automatically control the height of the fifth wheel coupling when it is coupled to the kingpin of the trailer, to control the height of the trailer coupling head, and comprises a first sensor that senses the boom angle, a second sensor that senses an angle of the fifth wheel coupling, and a controller that is configured to automatically control the height of the fifth wheel coupling based on the sensed boom angle and the sensed fifth wheel coupling angle, and a tractor coupling head that comprises at least one of an air line connector that is configured to be operably coupled to an air line connector of the trailer coupling head or an electrical connector that is configured to be operably coupled to an electrical connector of the trailer coupling head. The trailer coupling head comprises mechanical features that are configured to engage with mechanical features of the tractor coupling head to provide for motions of the trailer coupling head along a vertical axis that is orthogonal to the longitudinal axis, and motions of the tractor coupling head along a transverse axis that is orthogonal to both the vertical axis and the longitudinal axis. A tractor coupling head carrier is configured to removably carry the tractor coupling head and comprises a four-bar linkage mechanism that is configured to allow the tractor coupling head to move along the transverse axis, and to rotate about the vertical axis, and comprises a fixed link, two grounded links that are pivotably coupled to the fixed link, and a floating link that is pivotably coupled to both grounded links, wherein the tractor coupling head is removably coupled to the floating link, wherein the floating link comprises opposed inwardly-angled funnel surfaces that are configured to engage with a mechanical feature of the trailer coupling head to provide for motion of the tractor coupling head along the transverse axis, wherein the floating link comprises opposed upwardly-angled ramp surfaces that are configured to engage with a mechanical feature of the trailer coupling head to provide for motion of the trailer coupling head along the vertical axis. The tractor coupling head carrier further comprises a mechanical feature that is configured to engage with a centering funnel of the tractor as the tractor coupling head carrier is moved along the longitudinal axis away from the trailer coupling head toward the tractor to a home position relative to the tractor. A tractor coupling head carrier control system is configured to move the tractor coupling head carrier toward and away from the trailer coupling head along the longitudinal axis and comprises a single degree of freedom linear actuator carried by the tractor and configured to move the tractor coupling head carrier toward and away from the trailer along the longitudinal axis. A clamping mechanism is carried by the tractor coupling head and is configured to establish at least two alternative clamping states, one clamping state where the tractor coupling head is clamped to and carried by the tractor coupling head carrier such that the tractor coupling head is moved as the tractor coupling head carrier is moved, and a second clamping state where the tractor coupling head is clamped to the trailer coupling head such that the tractor coupling head carrier is free to move relative to the tractor coupling head, wherein the clamping mechanism comprises a clamping arm configuration that alternately clamps to the tractor coupling head carrier and the trailer coupling head.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures:

FIG. 8A is a side view of the trailer coupling head assembly of FIG. 6, while

FIG. 8C is a longitudinal cross-sectional view taken along line 8C-8C, FIG. 6, detailing the flexures, while

FIG. 9A is a side view of the trailer coupling head assembly of FIG. 6 engaged on a trailer and carrying air lines and an electrical line, while

DETAILED DESCRIPTION

Figure 1:
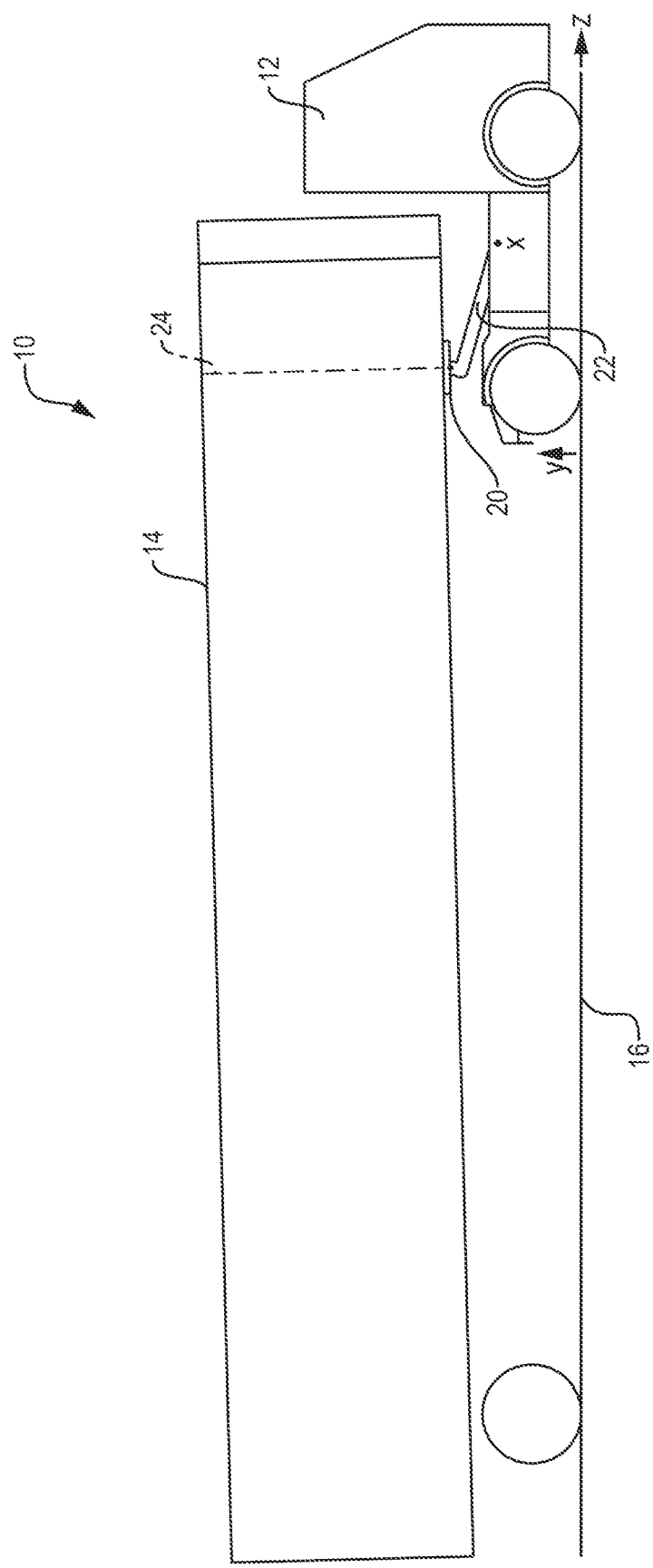
FIG. 1 is a side view of a tractor-trailer combination.

Examples of the methods, systems, and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In the present automatic tractor trailer coupling system and method, a tractor coupling head is movable toward and away from the tractor by a tractor coupling head carrier, and a trailer coupling head is carried by the trailer. The system includes sensors that determine the angles of the tractor boom and the fifth wheel coupling carried at the end of the boom; the approximate height of the trailer coupling head can be determined from these two angles and the length of the boom. The system calculates when the boom has been raised to the height that most closely matches the height of the trailer-side coupling head to the tractor-side coupling head. Small mismatches are accommodated by other elements of the system, such as compliance of the trailer-side coupling head. A single degree-of-freedom linear actuator is used to move the tractor coupling head into mating engagement with the trailer coupling head. The tractor coupling head carrier includes a mechanical linkage that laterally aligns the two heads while keeping them directly facing each other as they are mated together. The two coupling heads include interfitting mechanical features that allow for final minor lateral and/or vertical alignment of the heads. A flexure that carries the trailer coupling head allows for small vertical movements of the head, to account for minor vertical misalignment. The flexure can also allow minor rotations of the trailer coupling head about the longitudinal axis, to account for minor rotational (i.e., in roll) misalignments. Position sensors in the tractor coupling head indicate when the heads are properly mated such that the air and electrical connections are coupled together. A latching mechanism carried by the tractor coupling head latches the tractor coupling head to the trailer coupling head, which allows the tractor coupling head carrier to be withdrawn back to its home position on the tractor, leaving the tractor coupling head at the trailer. This allows for independent rotation of the trailer relative to the tractor, which is required for operation of the tractor-trailer in tight clearance applications. The tractor coupling head can later be removed from the trailer coupling head by movement of the tractor coupling head carrier by the linear actuator until the carrier is mated to and aligned with the tractor coupling head. The latch mechanism then releases from the trailer coupling head and clamps to the tractor coupling head carrier. The tractor coupling head carrier is then withdrawn back to its home position on the tractor, bringing the tractor coupling head with it.

FIG. 1 is side view of a tractor-trailer combination 10, illustrating tractor 12 connected to and ready to pull trailer 14 along ground 16. As is known in the field, this connection is accomplished by connecting the tractor's fifth wheel coupling 20 to the trailer kingpin (not shown). This establishes a trailer rotational axis 24. The height of fifth wheel coupling 20 can be established by controlling the angle of hydraulic boom 22. For ease of reference herein, spatial axes X (lateral horizontal axis), Y (vertical axis), and Z (forward and aft longitudinal axis) are identified.

Figure 2:
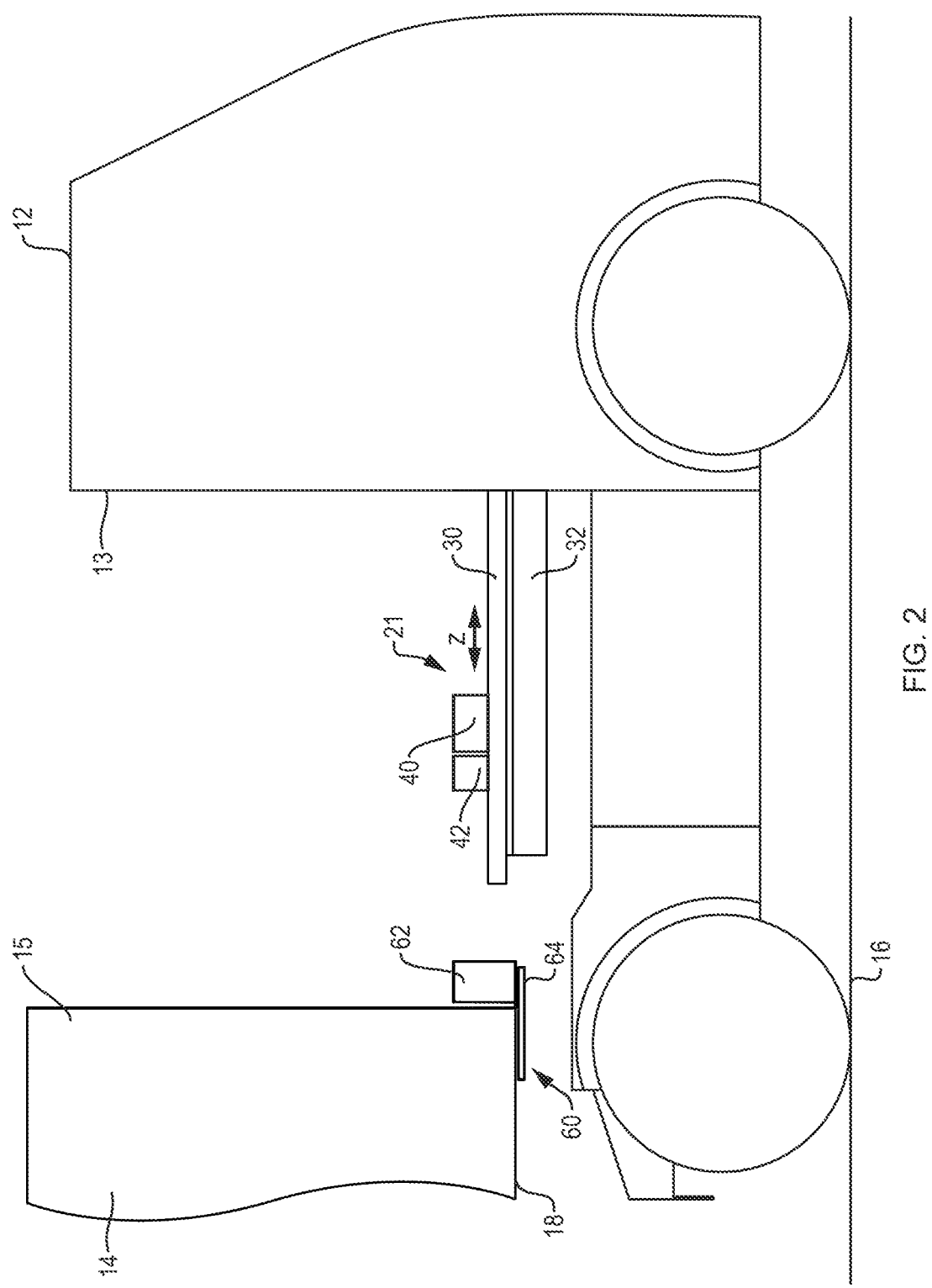
FIG. 2 is a schematic view of aspects of a system for automatically coupling air lines and electrical lines from a tractor to a trailer.

The subject system and method is fully automated: no human involvement or intervention is needed (presuming that the trailer is carrying the trailer-side coupling assembly). A tractor-side coupling head is moved toward and away from the trailer (along the longitudinal Z axis). FIG. 2 is a schematic view of aspects of a system for automatically coupling air lines and an electrical line from a tractor to a trailer. Linear actuator 21 is carried at the back 13 of tractor 12 and includes rail 30 carried by structural support 32. Carrier 40 can be controlled to move on rail 30 in both directions along the Z axis (i.e., toward and away from trailer 14). Carrier 40 removably carries tractor coupling head 42 that is configured to mate with trailer coupling head 62 that is carried at the front 15 of trailer 14. In an example trailer coupling assembly 60 includes trailer coupling head 62 that is carried by frame 64. Frame 64 is coupled to trailer 14 such that the position of the trailer coupling head 62 is at a known height. In some examples frame 64 is carried at the bottom, side, and/or front 15 edge of trailer 14 and configured to place coupling head 62 just at or in front of the front 15 and at or close to the bottom 18. As explained in more detail below, since not all trailers are the same, this known positioning can be accomplished at least in part by referencing the trailer coupling head to the front edge and/or a side of the trailer using an appropriately-designed frame that carries the head or the frame. In an example, mating heads 42 and 62 each include two separate air line fittings and an electrical connector. When the air line fittings and electrical connectors are mated together, compressed air and electrical signals from tractor 12 are passed to trailer 14.

Figure 3A:
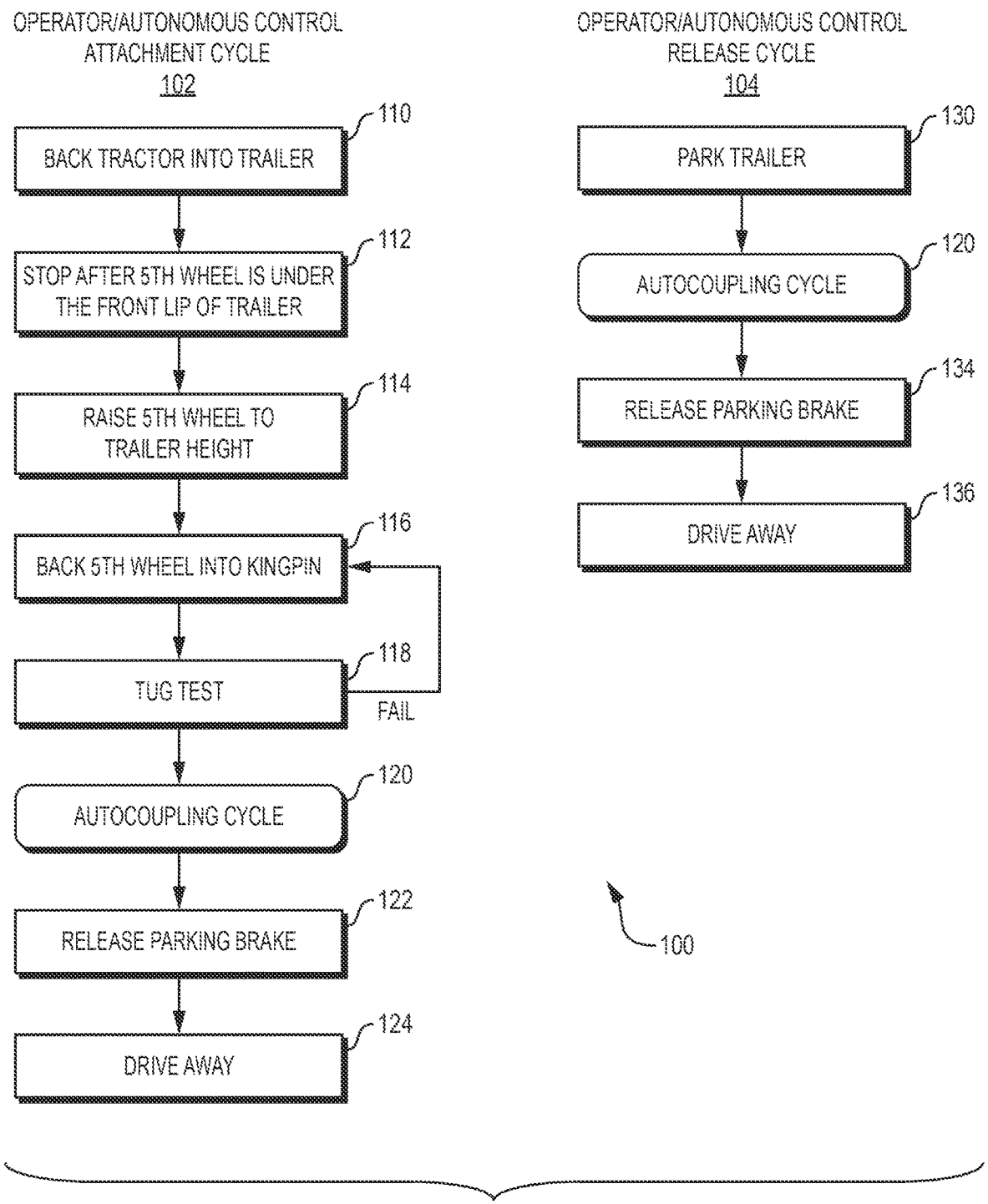
FIGS. 3A-3C together are a flowchart detailing operations of a system for automatically coupling air lines and electrical lines from a tractor to a trailer.
Figure 3B:
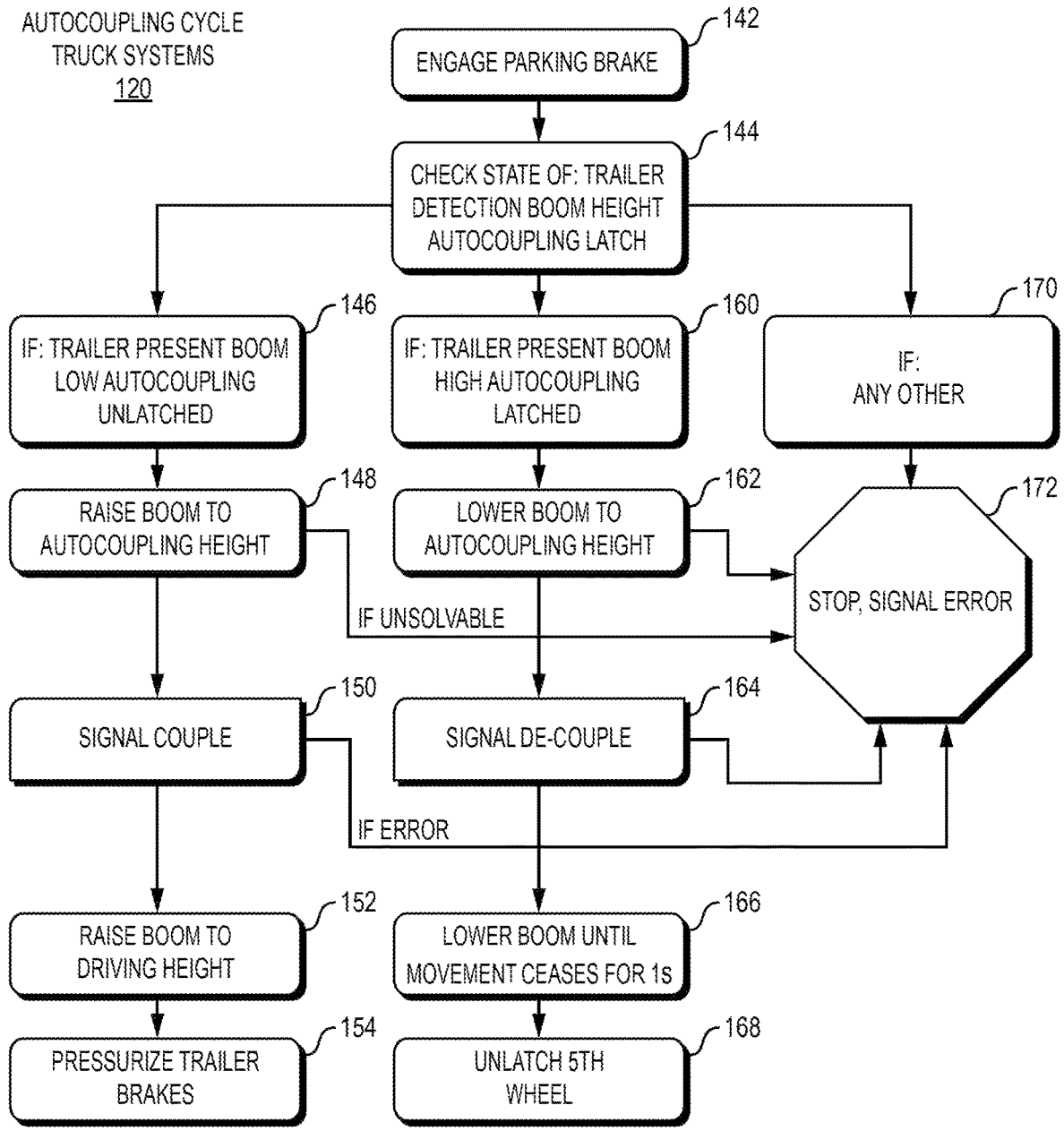
Figure 3C:
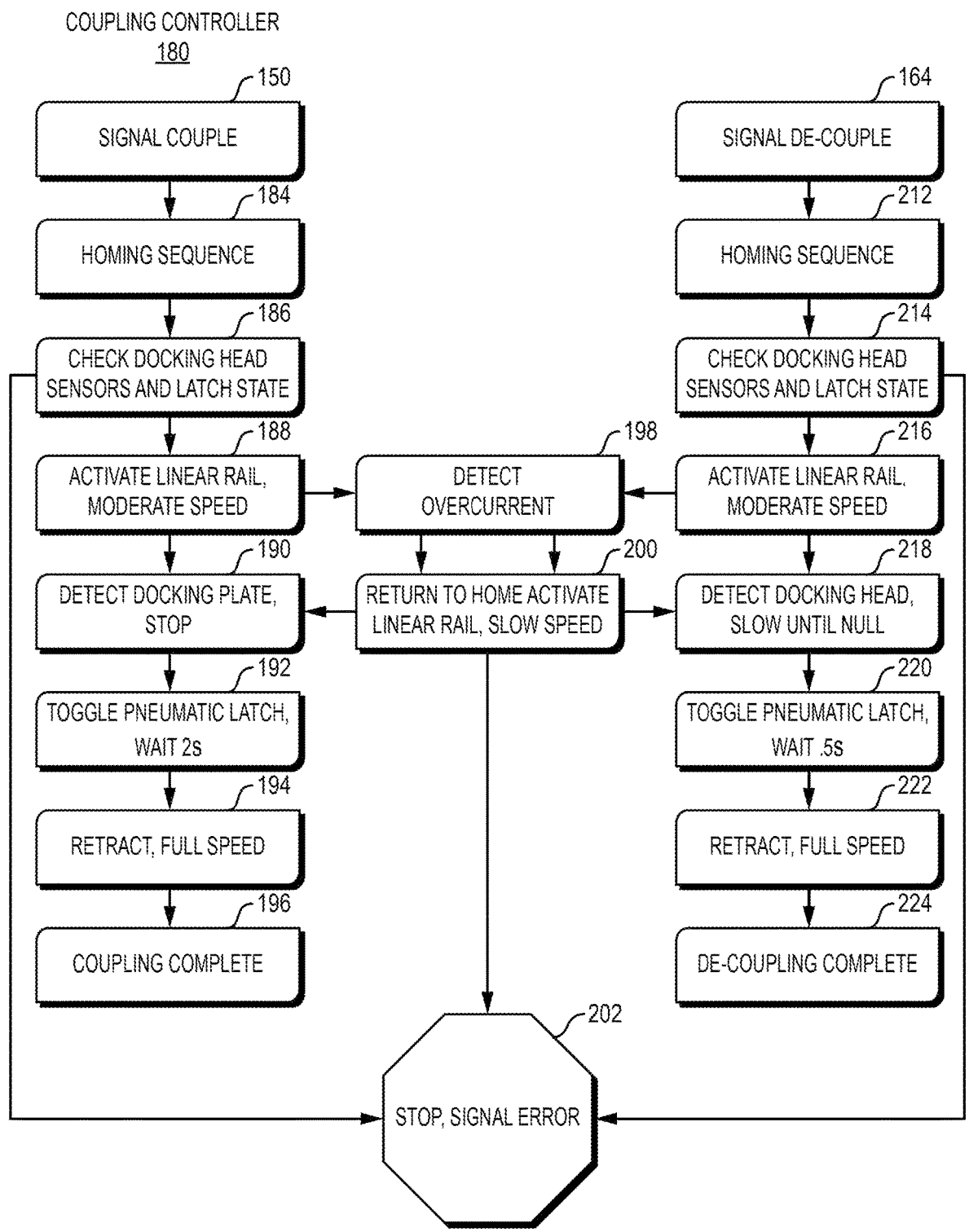

FIGS. 3A-3C together are a flowchart 100 of operation of an exemplary automatic coupling system and method which uses three different automated systems/methodologies: a tractor operation system (the relevant operation of which 102, 104 is detailed in FIG. 3A), a tractor control and interface system (the relevant operation of which 140 is detailed in FIG. 3B), and a tractor/trailer coupling head control system (the relevant operation of which 180 is detailed in FIG. 3C).

In fully automated tractor/trailer attachment cycle 102, FIG. 3A, the tractor is first connected to the trailer (via the tractor's fifth wheel coupling). The tractor coupling head is mated to and latched to the trailer coupling head, and the tractor drives away, pulling the trailer. In more detail, the tractor is backed into the trailer and stopped when the tractor fifth wheel is under the front lip of the trailer, steps 110 and 112. The fifth wheel is raised to the height of the trailer and the tractor is backed up into the trailer until the fifth wheel latches to the trailer kingpin, steps 114 and 116. A tug test 118 is then performed, which entails driving forward without releasing the trailer's brakes; if the tractor and trailer remain connected the test is passed, if not the latching of the fifth wheel to the kingpin is retried. Step 120 entails coupling the tractor coupling head to the trailer coupling head, details of which are disclosed in FIGS. 3B and 3C. The parking brake is then released and the tractor drives away, steps 122 and 124.

In fully automated tractor/trailer release cycle 104, FIG. 3A, the trailer is parked, step 130. Then an auto-coupling cycle is run, step 120; this decouples the tractor coupling head from the trailer coupling head and disconnects the tractor from the trailer. The tractor parking brake is released, step 134, and the tractor drives away, step 136.

Fully automated auto-coupling cycle operation 120, FIG. 3B, accomplishes both proper connection of the tractor to the trailer, and proper disconnection of them. After the parking brake is set, step 142, the state of two sensor systems and a calculation (described elsewhere herein) are checked step 144: "trailer detection" and "auto-coupling latch" are sensor systems, while "boom height" is a calculation. If there is a problem with step 144, steps 170 and 172 lead to a halt in operations and signaling an error.

When the trailer is present, the boom is low and the two coupling heads are unlatched, step 146, the trailer air and electrical lines are not connected to the tractor, and the system is ready to perform an auto-couple operation. The tractor is operably connected to the trailer by first raising the boom to the proper height, step 148, and then signaling a couple operation, step 150 (details of which are disclosed in FIG. 3C). If the boom is not successfully raised to the proper height or if there is a couple error, an error is signaled and operation stops, step 172. If there is no error the boom is raised to driving height (where the trailer landing gear is pulled off of the ground), step 152, and the trailer brakes are pressurized, step 154.

If the trailer is present, the boom is high and the two coupling heads are latched, step 160, the trailer air and electrical lines and the trailer itself are connected to the tractor, and the system is ready to perform an automatic uncoupling operation. The tractor is operably disconnected from the trailer by first lowering the boom to the proper auto-coupling height, step 162 and then signaling a de-couple operation, step 164 (details of which are disclosed in FIG. 3C). If the boom is not successfully lowered or if there is a de-couple error, an error is signaled and operation stops, step 172, awaiting human intervention (such as manually coupling the air lines and the electrical line, or perhaps more intervention as needed). If there is no error, after the decoupling step 164 is completed, the boom is lowered until its movement ceases for a determined time (e.g., 1 second), step 166 (meaning that the trailer landing gear has contacted the ground) and the fifth wheel is unlatched, step 168.

Fully automated coupling controller operation 180 is detailed in FIG. 3C. When a couple is signaled, step 150, a homing sequence 184 is begun, wherein the tractor coupling head is moved into position with and then latched to the trailer coupling head, as set forth in steps 186-196. In step 186 sensors on the tractor coupling head, and the latch state (both described elsewhere) are checked, to ensure that the tractor coupling head is in the home position at the tractor, and that it is latched to its carrier. The drive for the linear rail system (also described elsewhere) is activated, at moderate speed, step 188. This moves the tractor coupling head toward the trailer coupling head. If an overcurrent is detected, step 198, the docking head returns home, and docking is attempted again with speed slowed, step 200. An overcurrent condition could occur if the trailer side element is too misaligned to the tractor side, incorrectly installed, damaged, or missing. The tractor side coupling would hit it with some force and without detecting anything on its inductive sensors; the motor, however, would see a current spike from the additional sudden jolt in force from running into an unexpected obstacle. It is possible that this state could be reached as a false-negative from simply engaging too quickly with the trailer side coupling head, so the tractor side will return to home position, and go out again, but at a slower speed. This eliminates the false-negative condition while still keeping fast cycle times. If the second coupling attempt fails, then an error is indicated to the human operator.

When an inductive sensor on the tractor coupling head detects a docking plate on the trailer coupling head, the linear rail is stopped, step 190; the two coupling heads are now mated together, with the air line seals touching and the electrical connectors in electrical contact. The pneumatic latch of the clamping system is then toggled, to release the tractor coupling head from its carrier and latch it to the trailer coupling head, step 192. After a short wait, the linear rail is operated in reverse to retract the tractor coupling head carrier (without the tractor coupling head), step 194. When the home position is sensed (e.g., using a sensor (not shown) which may be a non-contact induction sensor which detects magnetic eddies in electrically-conducting materials), coupling is complete, step 196. In an example, when the system is first enabled, the first step is to "home" the tractor coupling head assembly by figuring out where this tractor coupling head carrier mounted sensor is. The system keeps a digital memory of the position of the assembly, for example based off of the number of rotations counted in the linear actuator motor (described below). The digital memory can be used as a "home" position until the system is power cycled again and the home sensor is queried. Additionally, a soft limit can be hard-coded at the end of the motor's travel; that is, there can be a set position at the end of the actuator which is inferred from the mechanical properties of auto-coupling. The motor will not move the mechanism past that pre-set number of rotations. Note that this same functionality could be accomplished using another sensor at the end of the travel.

When a de-couple is signaled, step 164, a sequence 212 is begun wherein the tractor coupling head carrier is moved into position with and then latched to the tractor coupling head, as set forth in steps 214-224. In step 214 sensors on the tractor coupling head carrier, and the latch state, are checked, to ensure that the tractor coupling head carrier is in the home position at the tractor, and that the tractor coupling head is latched to the trailer coupling head. The drive for the linear rail system is activated, at moderate speed, step 216. This moves the tractor coupling head carrier toward the tractor coupling head. If an overcurrent is detected, step 198, speed is slowed, step 200. When an inductive sensor on the tractor coupling head detects the tractor coupling head carrier, the linear rail is slowed until a null state (i.e., a travel end point) is reached, step 218. The tractor coupling head carrier is now in position relative to the tractor coupling head. The pneumatic latch of the clamping system is then toggled, to release the tractor coupling head from the trailer coupling head and latch it to its carrier, step 220. After a short wait, the linear rail is operated in reverse to retract the trailer coupling head carrier (with the coupling head), step 222. When the home position is sensed or the encoder on the linear actuator motor counts the "home" position, decoupling is complete, step 224.

Figure 4:
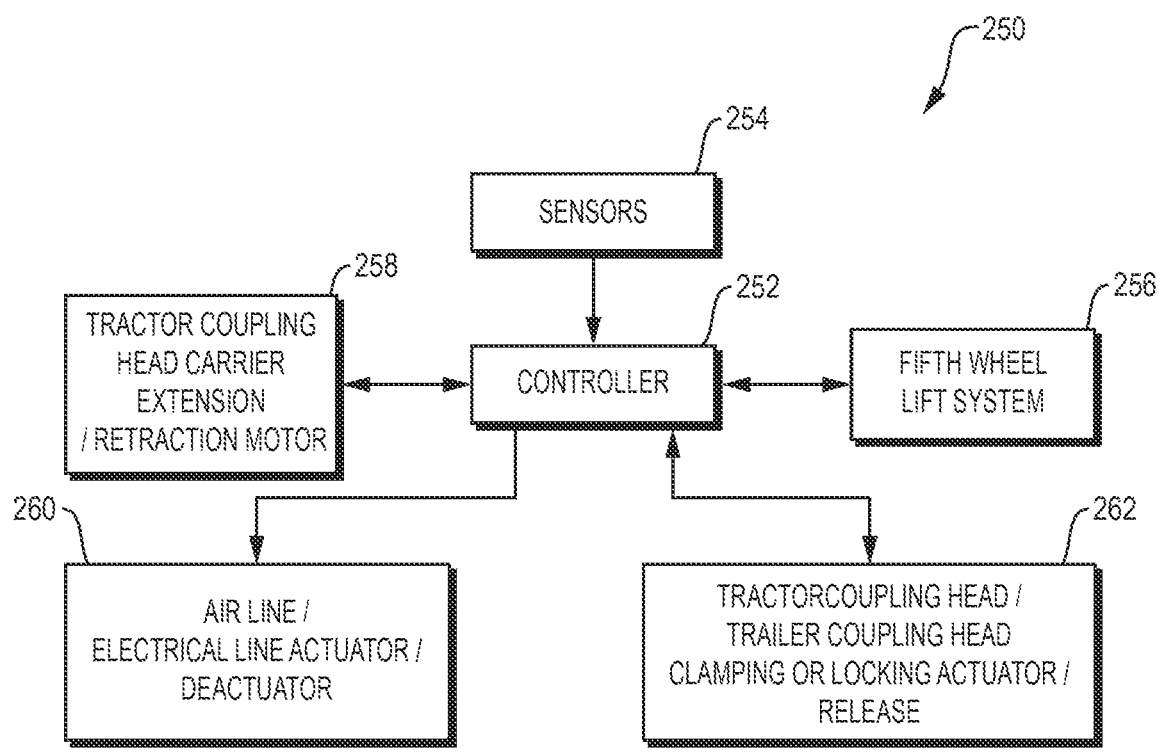
FIG. 4 is a schematic block diagram of a system for automatically coupling air lines and electrical lines from a tractor to a trailer.

FIG. 4 is a schematic diagram of an exemplary control system 250 for the subject automatic tractor trailer coupling system. Controller 252 may be accomplished using one or more physical controllers. Controllers are well known in the technical field. In some examples they may include one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Controller 252 is input with data from all of the sensors 254, and is configured to control the tractor fifth wheel height via fifth wheel lift system 256; to control the linear actuator extension/retraction motor 258; to control the tractor/trailer coupling head clamping mechanism 262; and to control air line/electrical line actuation 260 (for after the heads have been coupled).

Figure 5:
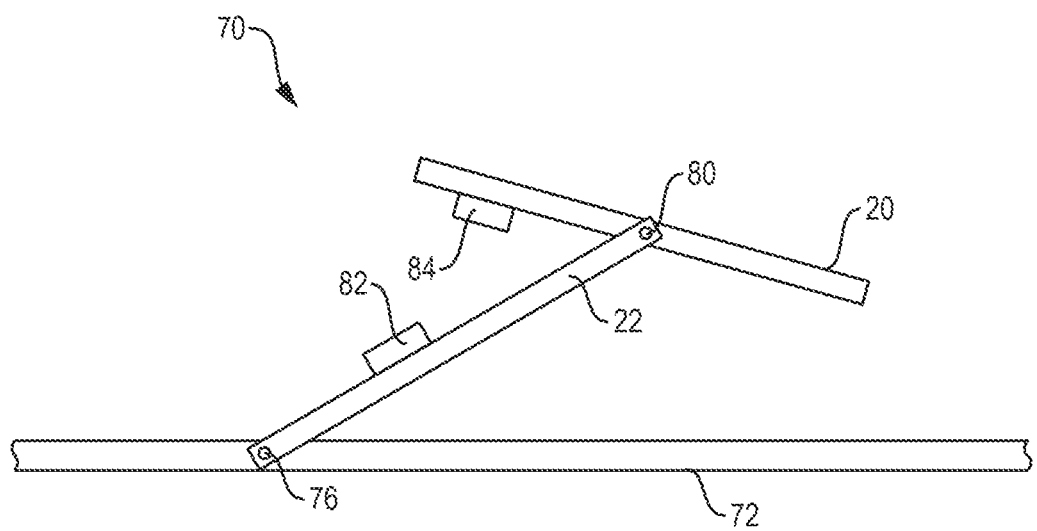
FIG. 5 is a schematic diagram of aspects of a system for automatically coupling air lines and electrical lines from a tractor to a trailer that relate to establishing the height of the trailer.

In some examples the tractor's fifth wheel coupling is carried at the end of an hydraulic boom, the angle of which is controllable to establish the height of the fifth wheel and thus the height of a trailer connected to the fifth wheel. FIG. 5 schematically illustrates trailer height adjustment system 70 that is configured to adjust the height of a trailer connected to the tractor. System 70 includes a sensor 82 (such as an inclinometer or an inertial measurement unit, for example) mounted to tractor boom 22 that pivots about pivot axis 76 relative to the tractor frame 72. Sensor 82 is configured to sense the angle of the boom relative to the horizontal and/or the derivative or change in the angle. Fifth wheel coupling 20 is carried at the end of boom 22, and is configured to be coupled to the trailer's kingpin (not shown), as is known in the field. Fifth wheel coupling 20 is free to passively pivot relative to boom 22 about pivot axis 80. A sensor 84 (such as an inclinometer or an inertial measurement unit, for example) is mounted to fifth wheel coupling 20. Sensor 84 is configured to sense the angle of the fifth wheel coupling relative to the horizontal and/or the derivative or change in the angle. The height of the trailer (and thus by inference the height of the trailer coupling head that is fixed to the trailer) can be calculated from the length of the boom and the two measured angles (or the two measured changes in angle). In some examples the calculation of the optimum boom angle is a trigonometric calculation based on the two sensed angles and the boom length. In some examples derivatives of angles are used to detect "hard limits" with raising and lowering the boom. The trailer can be detected as being at maximum height with the derivative of the boom angle reaching zero. Additionally, when dropping trailers with landing gears greater in height than the minimum position of the tractor, the derivative can be used to determine that the boom has put the trailer back on its landing gear, which is at an angle above the horizon of the truck.

The automatic tractor trailer coupling of this disclosure includes a fifth wheel coupling height control system wherein the trailer (not shown) is automatically raised to an "auto-coupling height" at which the trailer coupling head is at nominally the same height (the same Y position) as is the tractor coupling head. In some examples the height control system automatically controls the angle of the tractor's fifth wheel boom 22, and thereby establishes the height of the fifth wheel coupling 20 that is located at the end of the boom and is connected to the trailer's kingpin. Accordingly this also sets the height of the (bottom 18, FIG. 2) of the trailer. Since the trailer coupling head's location relative to the bottom of the trailer is known (via the design of trailer coupling assembly 60, FIG. 2), establishing the height of the fifth wheel coupling also establishes the height of the trailer coupling head.

In some examples, and as described above the height of the trailer coupling head is determined based on the angle of the boom, the angle of the trailer, and the boom length. In other examples the height control system can be accomplished in other manners. For example, optical sensors (e.g., laser-based sensors carried on the tractor) or range-finding sensors could identify the trailer coupling head (e.g., based on its shape), or a target could be mounted on the trailer coupling head. Orientation of the trailer coupling head relative to the sensors could be used to control the boom height.

FIGS. 6-17 illustrate aspects and details of an exemplary, non-limiting system for automatically coupling two air lines and an electrical line of a tractor to a trailer that is connected to the tractor via the fifth wheel coupling to kingpin connection. Generally, the tractor coupling head is removably carried by the tractor coupling head carrier, which is movable toward and away from the trailer. The trailer coupling head is carried by the trailer, in a known position as established by the trailer coupling assembly. The system includes sensors that determine the angles of the tractor boom and the fifth wheel coupling carried at the end of the boom; the height of the trailer coupling head can be determined from these two angles and the length of the boom. Once the tractor is physically connected to the trailer via the fifth wheel coupling, the system automatically adjusts the height of the trailer so that the trailer coupling head is at the same as the height of the tractor coupling head. A single degree-of-freedom linear actuator is then automatically controlled to move the tractor coupling head into mating engagement with the trailer coupling head. The tractor coupling head carrier includes a four-bar mechanical linkage that laterally aligns the two heads while keeping them directly facing each other as they are mated together. The two coupling heads include interfitting mechanical features that allow for the final minor alignments of the heads. A flexure that couples the trailer coupling head to the trailer allows for small vertical movements of the head, to account for minor vertical misalignment while keeping the trailer coupling head parallel to the tractor. The flexure can also allow minor rotations of the trailer coupling head about the longitudinal axis, to account for minor rotational misalignments. Position sensors in the tractor coupling head indicate when the heads are properly mated such that the air and electrical connections are secure. A latching mechanism carried by the tractor coupling head then latches the tractor coupling head to the trailer coupling head, which allows the tractor coupling head carrier to be withdrawn back to its home position on the tractor. The air lines and the electrical line from the tractor are now connected to those of the trailer, so that the tractor can supply compressed air that is used to operate the trailer's brakes, and can supply the electrical power and signals needed to operate the trailer's lighting system.

When the tractor is to be de-coupled from the trailer, the tractor coupling head can be removed from the trailer coupling head by movement of the tractor coupling head carrier by the linear actuator until the carrier is mated to and aligned with the tractor coupling head. The tractor coupling head's latch mechanism then releases from the trailer coupling head and clamps to the tractor coupling head carrier. The tractor coupling head carrier is then withdrawn back to its home position on the tractor. This disconnects the tractor's air lines and electrical line from the trailer. The tractor is then free to disengage from and drive away from the trailer.

Figure 6:
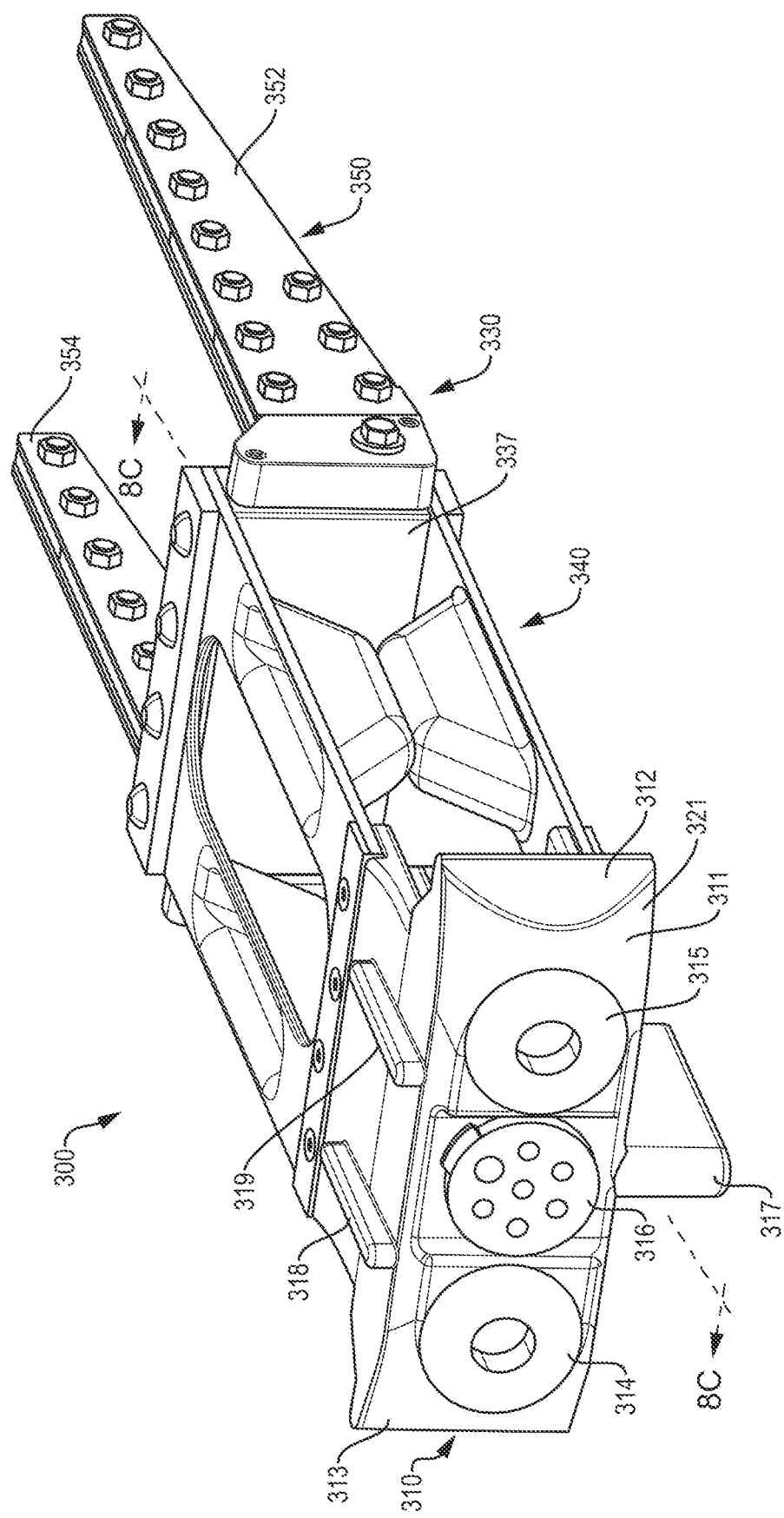
FIG. 6 is a perspective view of a trailer coupling head assembly of a system for automatically coupling air lines and electrical lines from a tractor to a trailer.
Figure 9A:
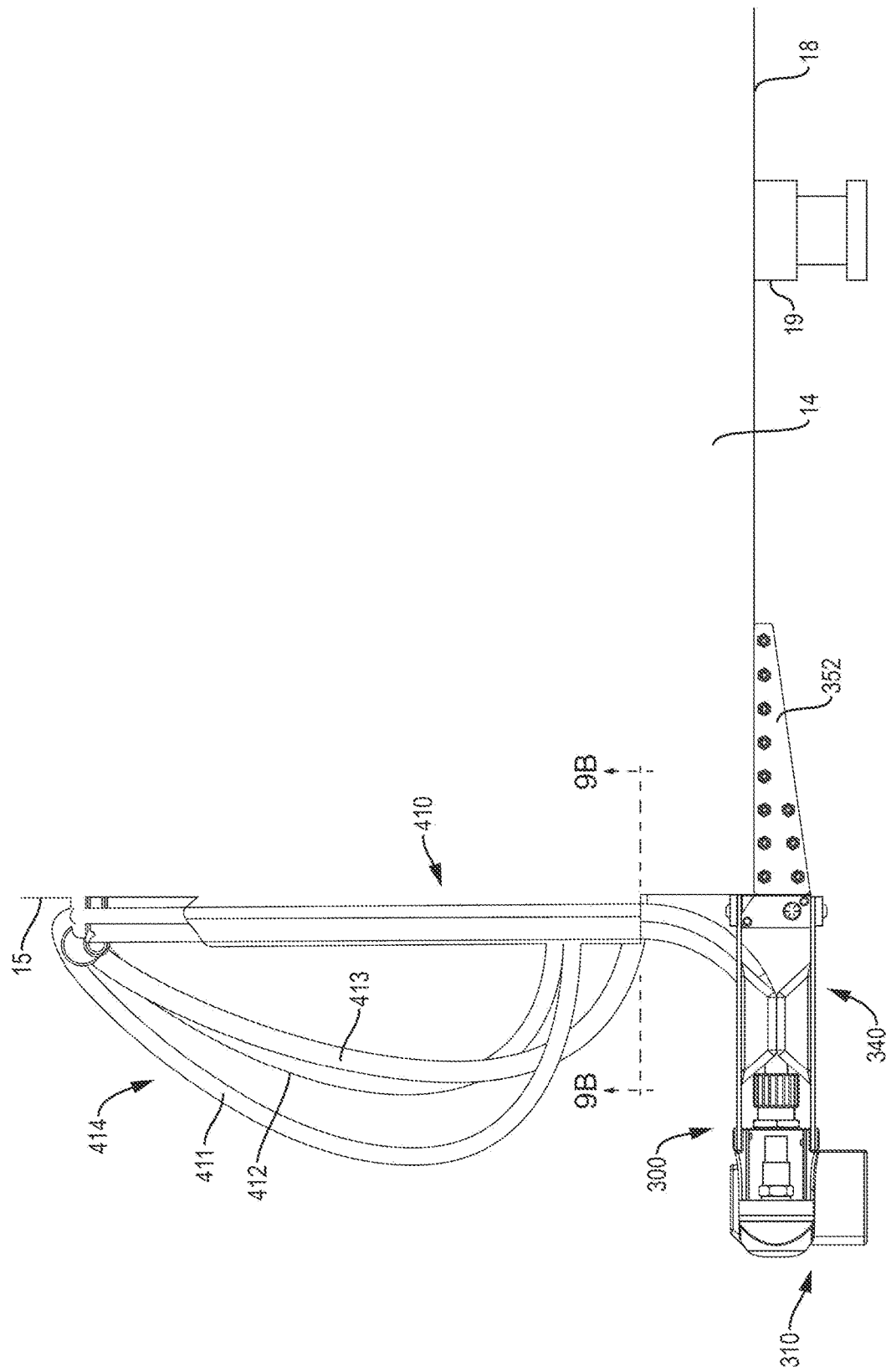

FIG. 6 details trailer coupling head assembly 300 that includes trailer coupling head 310 that is connected to trailer coupling frame 330 via flexures 340, which are illustrated and described in greater detail elsewhere herein. Flexures 340 provide at least some vertical compliance of the trailer coupling head relative to the trailer, and may be more compliant in one vertical direction than in the other vertical direction. Flexures 340 may also be constructed and arranged to provide some rotational compliance of the trailer coupling head relative to the trailer about the longitudinal axis. Extending magnetic member 350 is constructed and arranged to removably couple to an underside of the trailer and thereby couple the trailer coupling frame to the trailer. As shown for example in FIG. 9A, this places trailer coupling head 310 in front of the front face 15 of trailer 14, and at a known height relative to the bottom 18 of the trailer. Trailer kingpin 19 is shown in FIG. 9A.

In some examples the trailer coupling head 310 includes mechanical features that are configured to engage with mechanical features of the tractor coupling head and/or the tractor coupling head carrier, to provide for (at least) motions of the trailer coupling head along a vertical (Y) axis that is orthogonal to the longitudinal (Z) axis, and motions of the tractor coupling head along a transverse (X) axis that is orthogonal to both the vertical axis and the longitudinal axis. In an example, fin 317 and elongated projections 318 and 319 are configured to be received in corresponding slots in the tractor coupling head carrier and the tractor coupling head. Also, sloped bottom 321 of the trailer coupling head face 311 (see FIG. 8A) is configured to contact and ride on a sloped surface of the tractor coupling head and/or its carrier, to accomplish better vertical alignment of the heads. Coupling head 310 has ends 312 and 313. Many of these features are explained in more detail elsewhere herein.

Figure 8A:
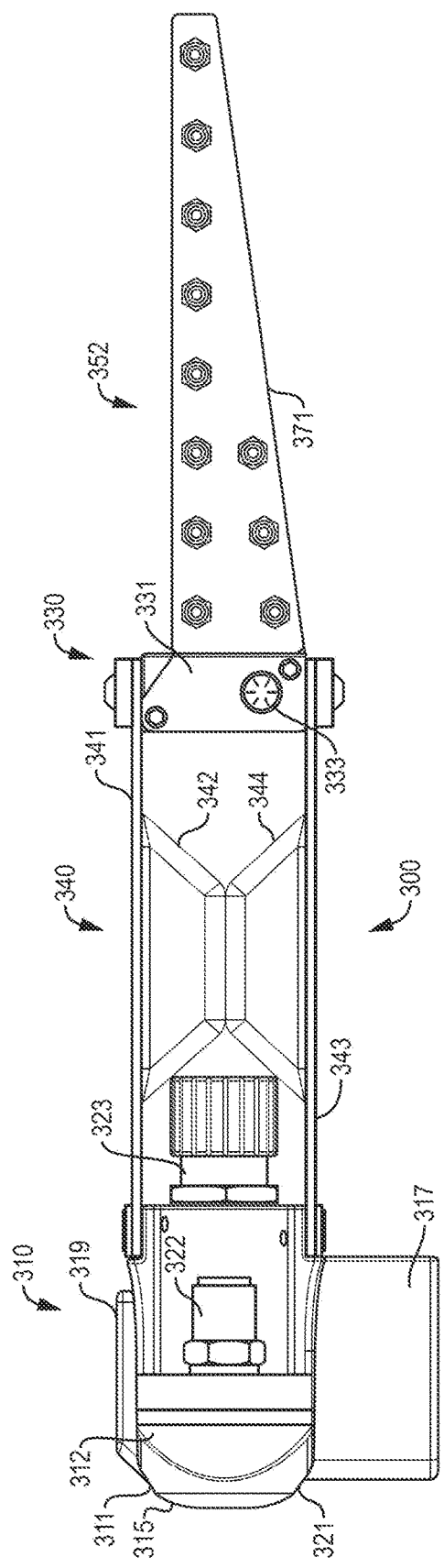

Trailer coupling head 310 includes air seal members 314 and 315, which can be the standard elastomeric seals used in manually-operated gland hand air connectors that are commonly used by human drivers to connect tractor air lines to those of a trailer. Also, electrical connector 316 is located between seal members 314 and 315 and includes the necessary electrical contacts to pass electrical power and signals into the trailer. FIG. 8A illustrates air coupling 322 that is operably coupled to seal member 315 and to which a standard trailer air hose can be connected. Similarly, electrical coupling 323 is operably connected to electrical connector 316 and to which a standard trailer electrical line can be connected.

Figure 7:
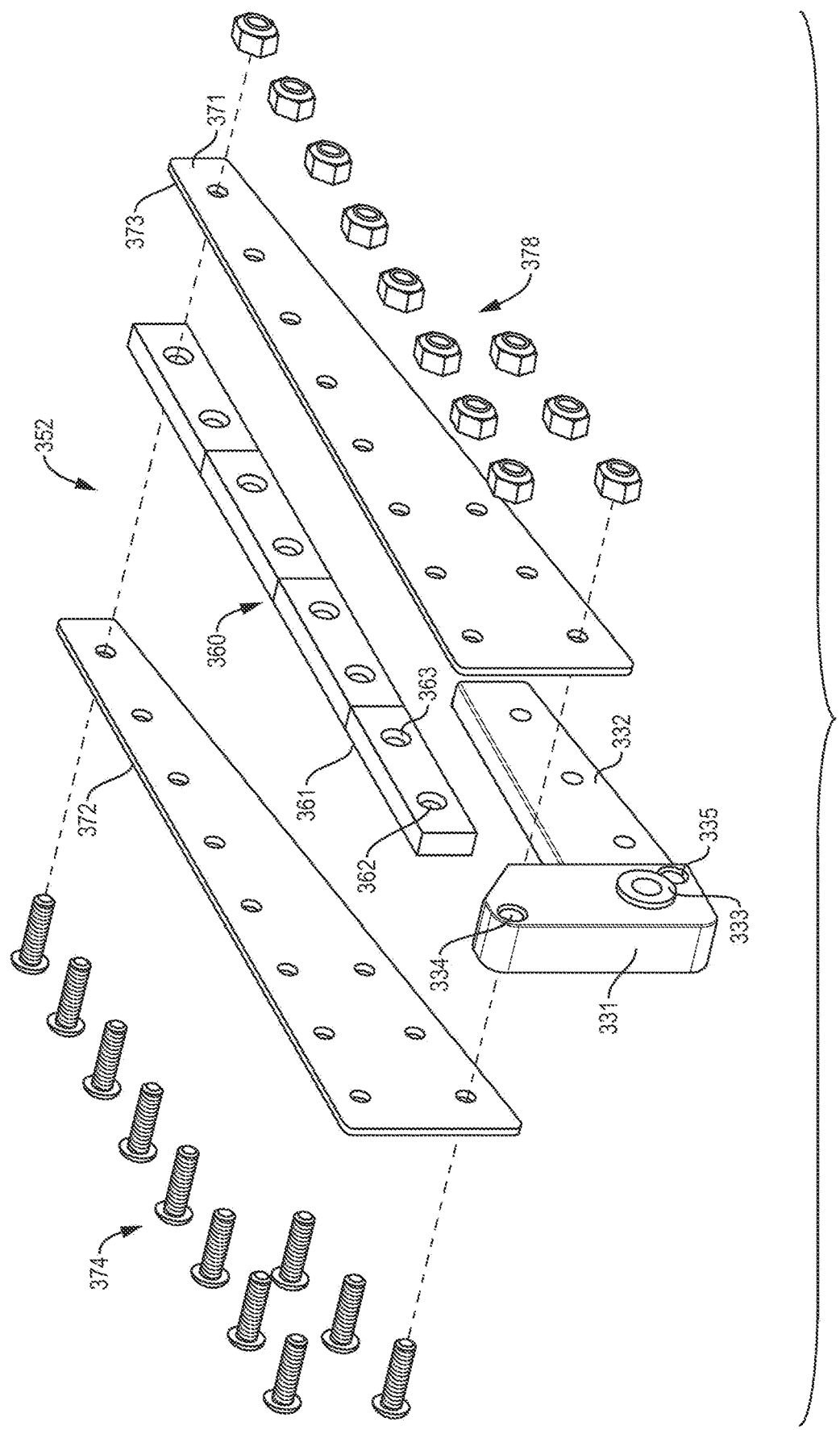
FIG. 7 is an exploded view of aspects of an extending magnetic member of the trailer coupling head assembly of FIG. 6.

In an example, extending magnetic member 350 includes identical extending magnetic arms 352 and 354. Exemplary details of arm 352 are illustrated in FIG. 7. Magnet assembly 360 (which in a non-limiting example includes four bar magnets such as magnet 361, arranged end-to-end as shown, where each magnet includes one or more through holes (e.g., holes 362 and 363) that receive one of non-magnetic (e.g., stainless steel) bolts 374 that each receive a nut 378) is held by side plates 371 and 372 that are coupled to member 332 that is pivotably coupled to portion 331 of frame 330. Other arrangements can be used alone or in combination to hold one or more magnets in place in the arms, such as with raised bosses in the side plates located around some or all of the magnet perimeters that hold the magnets in place, or a plastic shroud around the magnet perimeter that holds the magnets, or using an adhesive to fix the magnets to the side plates. If the magnets are otherwise suitably constrained from shifting position between side plates 371 and 372, non-magnetic bolts, if used to help hold plates 371 and 372 together, need not pass through the magnets themselves.

Pivot 333 allows arm 352 to pivot down and back toward coupling head 310 so that assembly 300 can be stored in less space than would be the case if arms 352 and 354 were fixed. Hardware (e.g., spring-loaded snap buttons) received in openings 334 and 335 can hold arm 352 in place. When this hardware is loosened or retracted, the arm can pivot relative to member 331 and central member 337, FIG. 6, that is the central member of frame 330. As shown in FIG. 6, the top of magnet assembly 360 is located just below the tops of arms 371 and 372 (e.g., top 373 of arm 371). Plates 371 and 372 are made of a magnetic material such as ferritic steel and so carry and direct and constrain the magnetic field, such that the tops of the arms are magnetic and can magnetically couple to the steel underside of the trailer. Since the magnets do not touch the trailer, they are less susceptible to erosion and wear that may result as operators install and remove these trailer side couplings repeatedly from a variety of trailers within a yard.

Flexures 340 are illustrated in FIGS. 6 and 8A-8D. In an example the flexures are made of plastic or plastic fiber composite or fiber-reinforced rubber, for example, though any other flexible material or composite suitable for use in the application capable of withstanding the environment seen by vehicle trailers may be used. Flexures 340 comprise upper flexure member 341 that is held by both frame 330 and head 310, and carries generally trapezoidal portion 342. Similarly, lower flexure member 343 is held by both frame 330 and head 310, and carries generally trapezoidal portion 344. Flexure members 341 and 343 could be die cut from reinforced rubber sheets, which would have the desired flexibility and would be able to withstand the rugged environment and treatment of the trailer assemblies. Portions 342 and 344 are separate, and are connected to the flexure members. Portions 342 and 344 are interfitting in such a manner that downward travel of head 310 is limited more than is upward travel. Also, in some examples the flexures are biased downwardly (e.g., by the weight of the head that they carry) such that head 310 is located slightly below frame 330, which can provide for additional upward movement of coupling head 310 to account for Y axis misalignment between the two heads. As shown in FIG. 6, each of plates 341 and 343 carry two sets of interfitted portions 342 and 344, with an empty space between them through which the two air lines and the electrical line can be routed. See FIG. 9A.

Figure 8B:
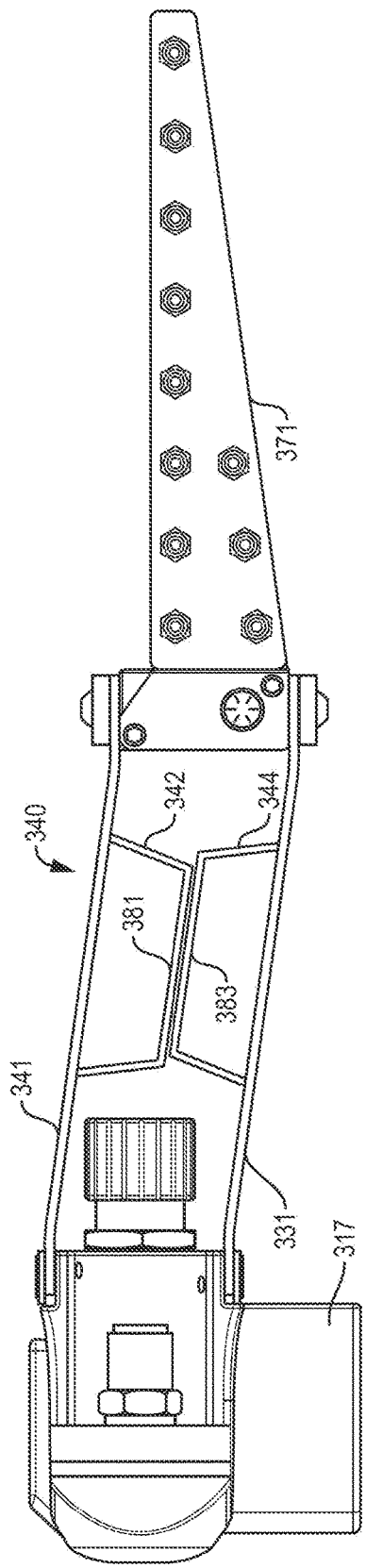
FIG. 8B shows the flexure more schematically and in a flexed position.
Figure 8C:
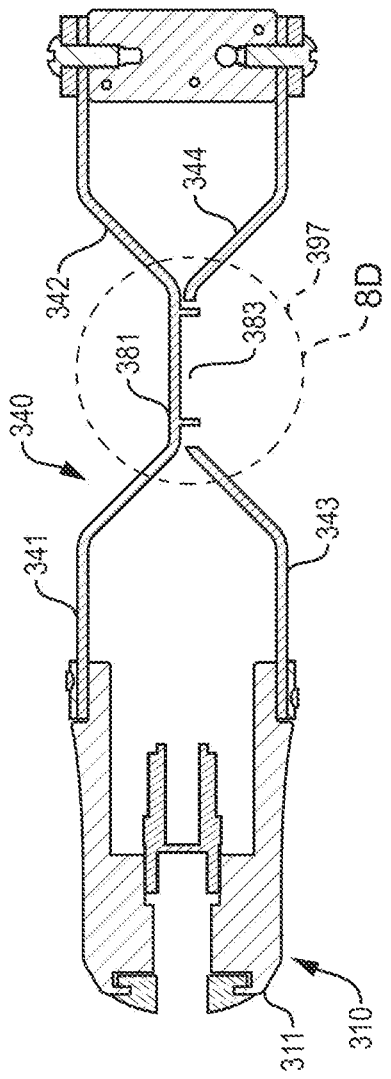
Figure 8D:
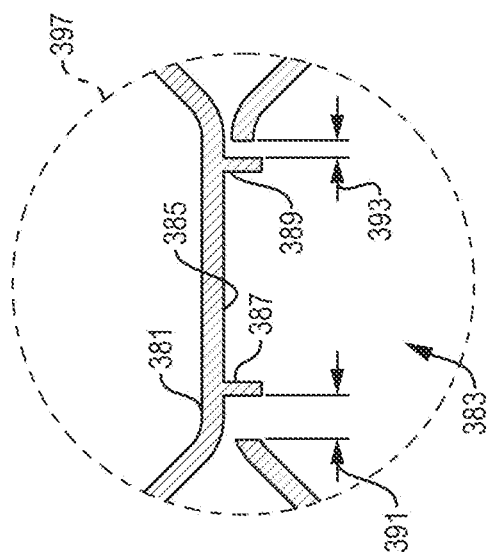
FIG. 8D is an enlarged view illustrating the flexure interaction of FIG. 8C.

One set of interfitted portions 342 and 344 is shown in more detail in FIGS. 8B-8D. As shown in FIG. 8B, portion 342 has lower wall 381 while portion 344 has upper wall 383. Walls 381 and 383 fit together in a tab and slot arrangement, shown in some detail in FIG. 8D, which is an enlargement of detail 397 from FIG. 8C. Wall 383 has slot 385 and wall 381 has protruding tabs or bosses 387 and 389. In the neutral position shown in FIGS. 8A, 8C, and 8D, tab 389 is closer to one end of slot 385 (indicated by distance 393) than is tab 387 to the other end of slot 385 (indicated by distance 391). A positive vertical force or deflection under trailer coupling head face 311 (e.g., when the coupling head impacts any of the ramps 741, 743, 745, or 753) causes top portion 342 to slide left relative to bottom portion 344. Portion 342 can slide over distance 391 before tab 387 hits the end of slot 385 and stops. Once tab 387 makes contact with the end of the slot in the bottom flexure portion it begins to transmit shear forces between the top and the bottom portions 342 and 344. Once these shear forces are transmitted, portions 342 and 344 form a single beam that is far stiffer that the two independent portions. Such positive deflection is illustrated in FIG. 8B. Similarly, when negative vertical forces are applied to the coupling head, top flexure portion 342 slides to the right relative to bottom portion 344. Portion 342 can slide a distance 393 before tab 389 hits the stop. Once tab 389 makes contact with the end of the slot in the bottom portion it begins to transmit shear forces between the top and the bottom portions. Once these shear forces are transmitted between the top and bottom portions they form a single beam that is far stiffer that the two independent portions. This design thus limits downward travel more than upward travel.

Figure 9B:
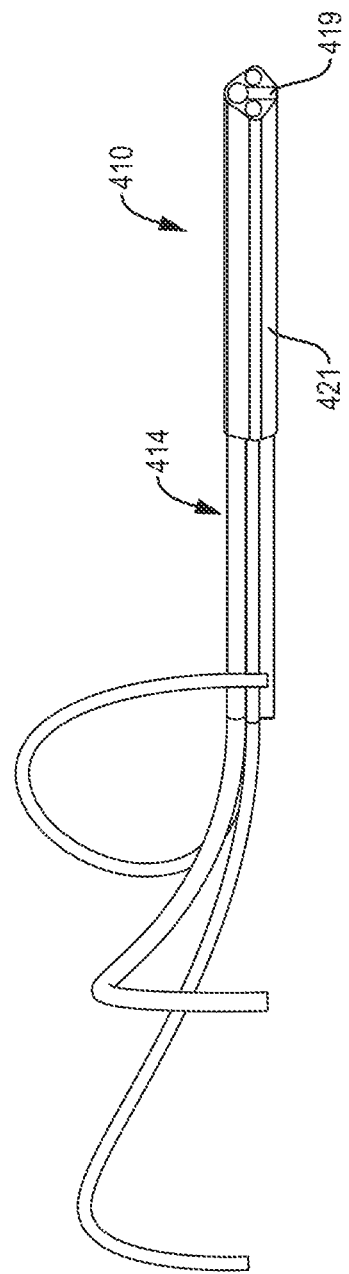
FIG. 9B is a cross-section taken along line 9B-9B, FIG. 9A.

FIG. 9A illustrates trailer coupling head assembly 300 coupled (via magnetic member 350) to the underside 18 of trailer 14, with coupling head 310 located in front of trailer front face 15, such that the head can be reached by and connected to the tractor coupling head, as described elsewhere herein. Air hoses 411 and 412 and electrical line 413 (making up hose/line set 414) run from coupling head 310, through flexures 340, and up through hose/line relief structure 410. Hose/line relief structure 410, shown in FIG. 9B, is a strain relief and support mechanism that is carried by the trailer coupling frame and that supports hose/line set 414. Structure 410 includes a differentially flexible support structure 419 that is more flexible in the transverse (X) direction and stiffer in the longitudinal (Z) direction so that the hoses and line can be pulled in different directions on the trailer face while not falling away from the trailer face. This differential flexibility allows the hoses and lines to bend side to side to reach the typical couplings of trailers while inhibiting them from bending forward or sagging toward the tractor. Wrap 421 keeps support structurer 419 and hose/line set 414 in place relative to one another.

Figure 10:
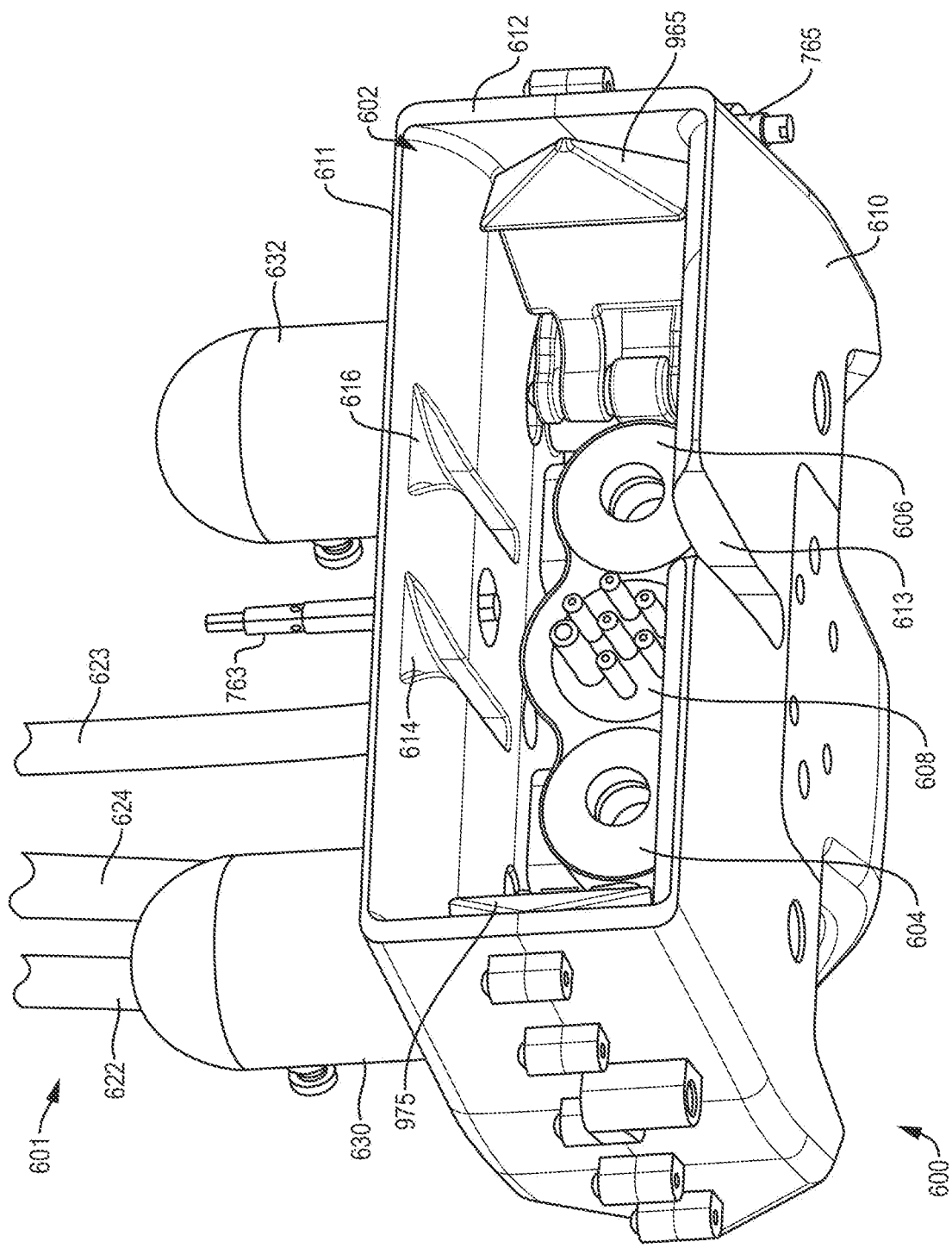
FIG. 10 is an interior perspective view of a tractor coupling head that is used with the trailer coupling head of FIG. 6.

FIG. 10 is an interior perspective view of tractor coupling head 600 that is configured to mate with the trailer coupling head described above. Tractor coupling head 600 includes housing 612 with open front side 602 that receives the trailer coupling head. Glad hand style air seals 604 and 606 and electrical connector 608 are arranged such that they will mate with the air seals and electrical connector of the trailer coupling head.

The tractor coupling head includes mechanical features that are configured to engage with features of the trailer coupling head to align the tractor coupling head with the trailer coupling head by providing for at least motions of the trailer coupling head along the vertical (Y) axis, and motions of the tractor coupling head along the transverse (X) axis. Slots 614 and 616 in housing top 611 are configured to accept tabs 319 and 318, respectively; their enlarged front openings allow the tabs to be received in the slots even though there might be some X axis misalignment between the heads. As explained below, coupling head 600 is carried such that it can translate (in a total amount that is constrained by the overall configuration of the tractor-side assembly) in both directions along the X axis. Accordingly, if the two coupling heads are slightly misaligned along the X axis, the seating of tabs 318 and 319 in slots 616 and 614 will push head 600 left or right, such that the two heads are properly aligned so that the air seals mate and the electrical connectors engage. Similarly, larger through-slot 613 in housing bottom 610 is configured to accept fin 317 of trailer coupling head 310, to help center the two heads along the X axis.

In the example, fin 317 is configured to engage with funnel surfaces 742 and 744 and slot 747 before the carrier has had a chance to bringing it into closer alignment in the Y direction. See FIG. 11. Fin 317 is long enough to accommodate for the fact that its Y alignment may be further off when the trailer coupling head and the carrier first make contact as they are engaged. Tabs 318 and 319 then provide fine alignment between the tractor and trailer coupling heads and engage after fin 317 has engaged the tractor coupling head carrier and face 311 has been pushed up, in order to match the Y positions of the two heads. Tabs 318 and 319 find slots 614 and 616 when the tractor and trailer heads are only a few inches apart. There is less clearance between tabs 318 and 319 and slots 614 and 616 and so the alignment of the heads is further refined before latching. The electrical connector pins must be lined up well before the latches can be actuated or else the electrical connector can bind. Tabs 318 and 319 ensure that the coupling heads are aligned adequately in the X axis and in Y rotation when the latch is actuated. When the tractor coupling head carrier is returned to pick up and remove the tractor coupling head from the trailer coupling head, since (due to gravity) the flexures bias the heads to its low position, the Y position of the tractor coupling head will be known from the angles of the two inclinometers (i.e., from the height of the trailer). This obviates the need for the fine alignments that are accomplished during the coupling operation.

Air lines 622 and 623 and electrical line 624 (making up air/electrical line set 601) run from the tractor into coupling head 600 and are connected to seals 604 and 606 and electrical connector 608. Air-operated actuators 630 and 632 are part of the clamping mechanism, as described in more detail below. Clamping arm ends 965 and 975 are also part of the clamping system.

Figure 11:
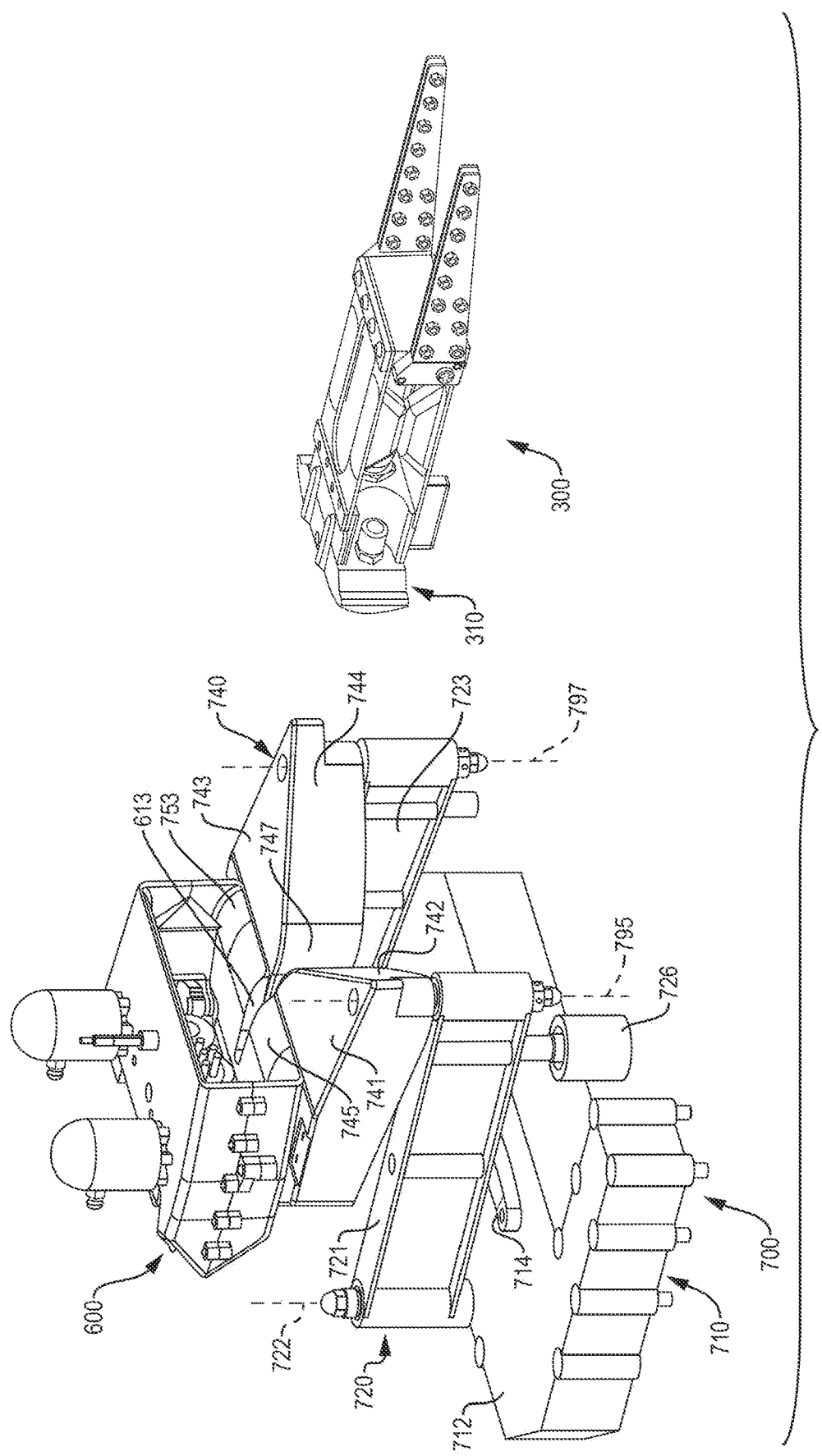
FIG. 11 is a perspective view of a tractor-side assembly with the tractor coupling head of FIG. 10 close to engagement with the trailer coupling head of FIG. 6.

FIG. 11 details tractor-side assembly 700 that includes coupling head carrier 710 that removably carries coupling head 600. Upwardly-sloped lower surfaces 745 and 753 of coupling head 600 are configured to be contacted by lower sloped portion 321 of the face of the trailer coupling head, which can push the trailer coupling head up (along the Y axis) to account for any height difference between the two heads. As described above the trailer coupling head assembly's flexures allow for some upward motion of the trailer coupling head.

Tractor coupling head carrier 710 is configured to be moved toward and away from the trailer, as described below. Carrier 710 also includes a linkage mechanism 720 that is configured to allow the tractor coupling head 600 to move along the transverse (X) axis and to rotate about the vertical (Y) axis. These motions allows the heads to align on the X axis while also allowing the face of the tractor coupling head to stay aligned with the face of the trailer coupling head as the two are brought together, so that the air seals and the electrical connectors meet directly face to face rather than being at a yaw angle to one another. In some examples linkage mechanism 720 comprises a four-bar linkage mechanism. In some examples the four-bar linkage mechanism comprises a fixed link, two grounded links that are pivotably coupled to the fixed link, and a floating link that is pivotably coupled to both grounded links. In some examples the tractor coupling head is removably coupled to the floating link. In some examples the floating link comprises opposed inwardly-angled funnel surfaces that are configured to engage with a mechanical feature of the trailer coupling head to provide for motion of the tractor coupling head along the transverse axis. In some examples the floating link comprises opposed upwardly-angled ramp surfaces that are configured to engage with a mechanical feature of the trailer coupling head to provide for motion of the trailer coupling head along the vertical axis.

Linkage mechanism 720, FIG. 11 (which is also shown, but more schematically, in FIG. 15, described further below) includes fixed link 712, which is also the structure that is carried by the linear actuator, as described in more detail below. Grounded links 721 and 723 can each pivot about fixed link 712 (along vertical pivot axes 722 and 724, respectively) (link 712 not shown in FIG. 15). Arc-shaped raised steel plate (boss) 714 is a surface that a ball detent (not shown) rides on. The ball detent locks the carrier in its centered position after each cycle of the system. The floating link 740 removably carries tractor coupling head 600. Floating link 740 can pivot about vertical axes 795 and 797 relative to links 721 and 723, respectively. In one example linkage mechanism 720 is a Grashof double rocker mechanism.

Figure 12:
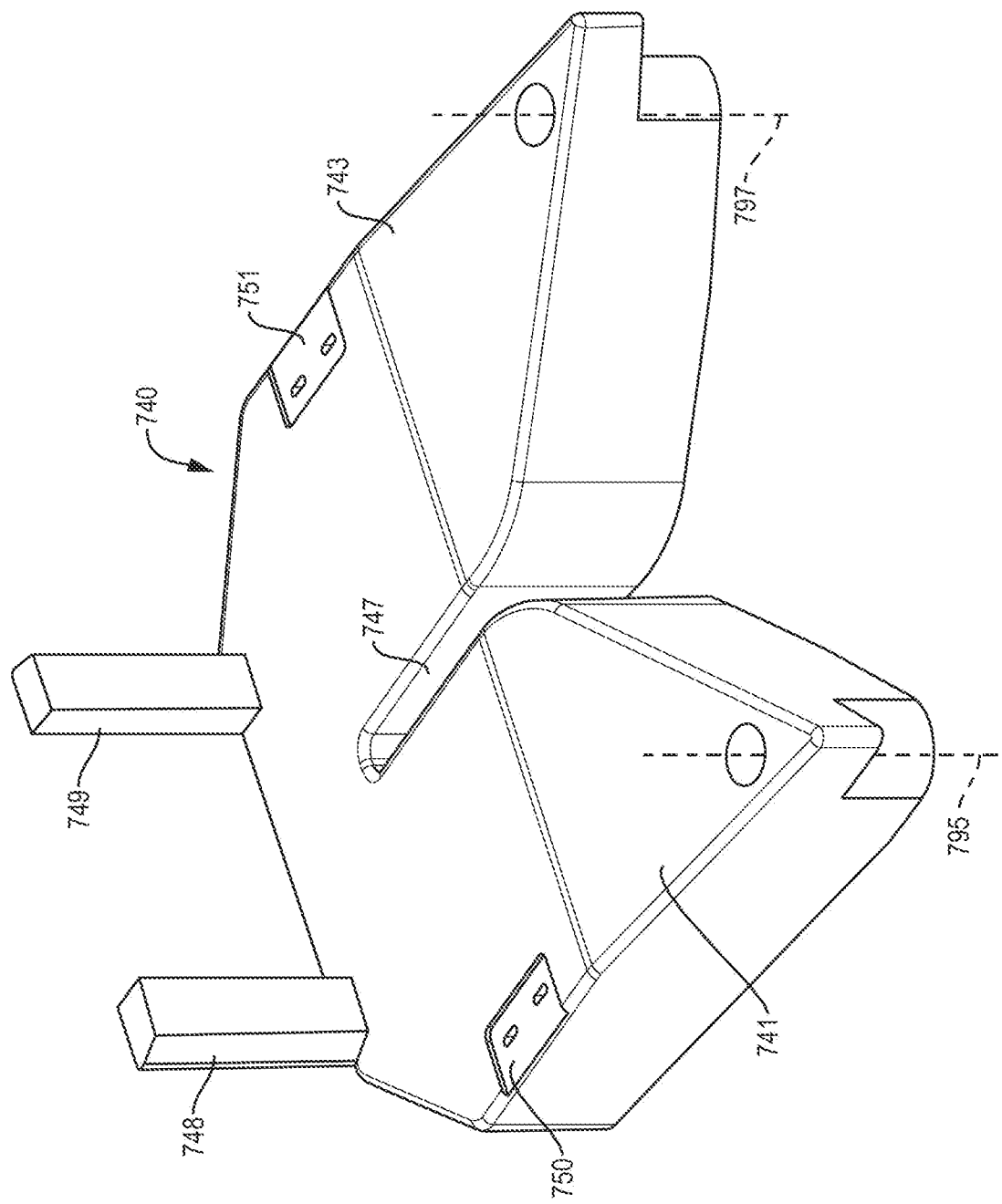
FIG. 12 is a perspective view of the floating link of the tractor-side assembly of FIG. 11.

In some examples floating link 740, shown in detail in FIG. 12, includes upwardly-sloped ramp surfaces 741 and 743 on both sides of slot 747. The lower sloped front portion 321 of the face of trailer coupling head 310 can be configured to contact surfaces 741 and 743, which can push the trailer coupling head up (along the Y axis) to account for any height difference between the two heads. As shown in FIG. 11, surfaces 741 and 743 can merge into surfaces 745 and 753 of head 600, to provide a continuous ramp that can guide the trailer head up into proper alignment with the tractor head. In an example flexures 340 are configured such that head 310 is biased downward but is able to deflect upward. Flexure members 341 and 343 can remain essentially parallel during such deflection, so that the trailer coupling head remains essentially flush to the tractor coupling head and does not pitch upwardly. Floating link 740 also includes funnel surfaces 742 and 744 that are configured to be contacted by fin 317, which will result in the tractor coupling head being pushed along the X axis, to facilitate alignment of the two coupling heads as they come together.

Linkage mechanism 720 carries a mechanical feature (e.g., roller 726) that is configured to engage with centering funnel 900 (FIGS. 13-15) that is fixed to the tractor and is used to establish a defined centered position of the tractor-side assembly when the tractor coupling head carrier is returned back to the tractor "home" position. Funnel 900 has inwardly-tapered sides 901 and 902 that are configured such that roller 726 will engage with one or both of them as the tractor carrier is returned back to its home position at the tractor, and guide the carrier left and right into the home position. The center position is fixed in both the X axis and the Z axis. A detent (e.g., a ball detent) (not shown) can be used to help retain linkage 720 in its center position relative to carrier 710 until the detent is overcome by forces along the X axis created when the two heads come into contact and are misaligned along the X axis, as described above. This then allows the tractor coupling head to translate along the X axis, as described elsewhere herein. After the ball detent releases, the tractor coupling head and its carrier are no longer fixed relative to the linear rail carriage. After the ball detent releases the degrees of freedom of the tractor coupling head and its carrier are controlled by the four-bar linkage.

Floating link 740, FIG. 12, also includes fixed posts 748 and 749 to which the tractor coupling head's clamping mechanism can clamp, to fix the head to the carrier. Areas 750 and 751 are locations of one or more sensing surfaces that are used to determine when the tractor coupling head carrier is close to its end point of coupling to the tractor coupling head, as explained in more detail below.

Figure 13:
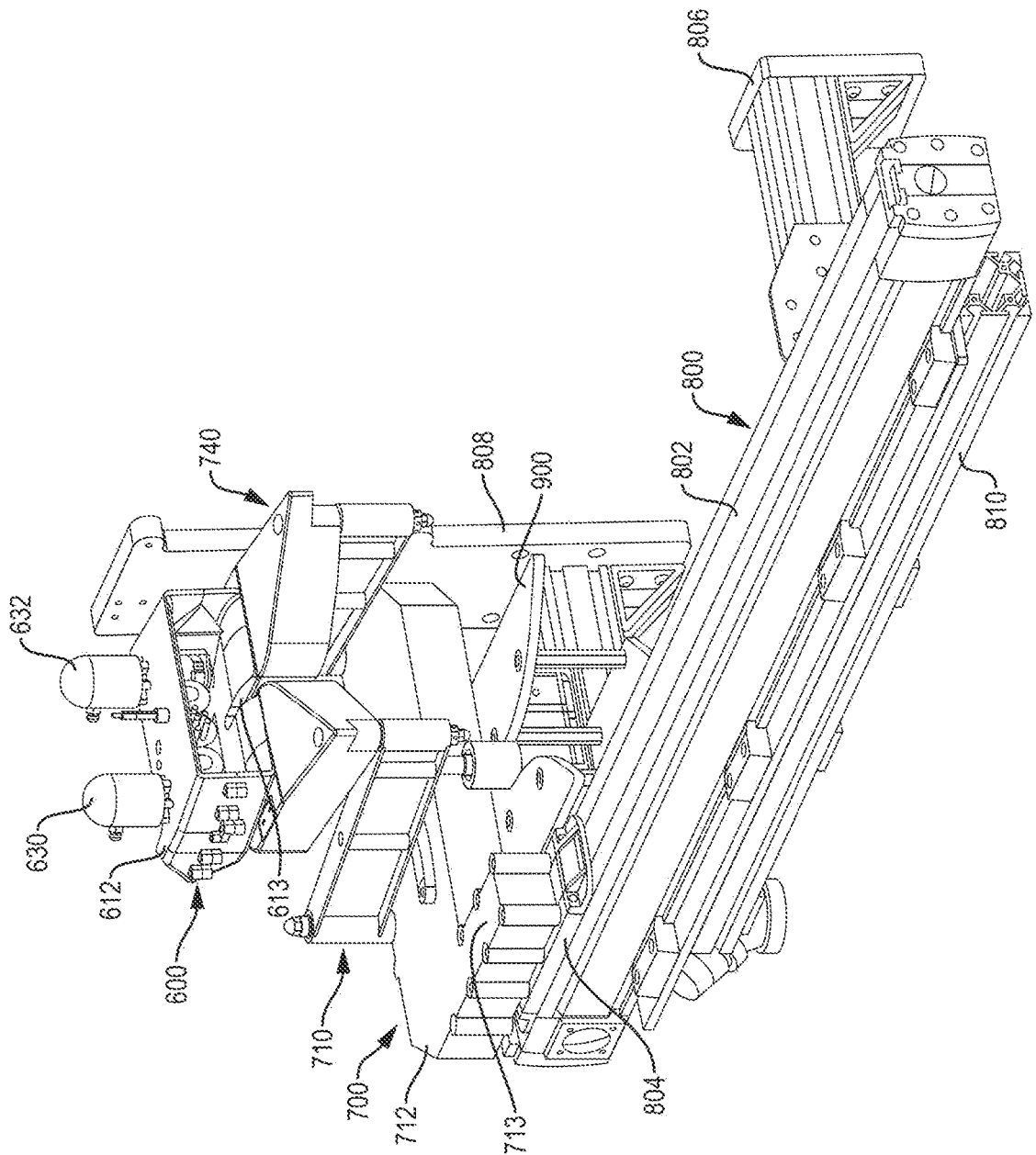
FIG. 13 is a perspective view of the tractor-side assembly of FIG. 11 engaged with a linear actuator.
Figure 14A:
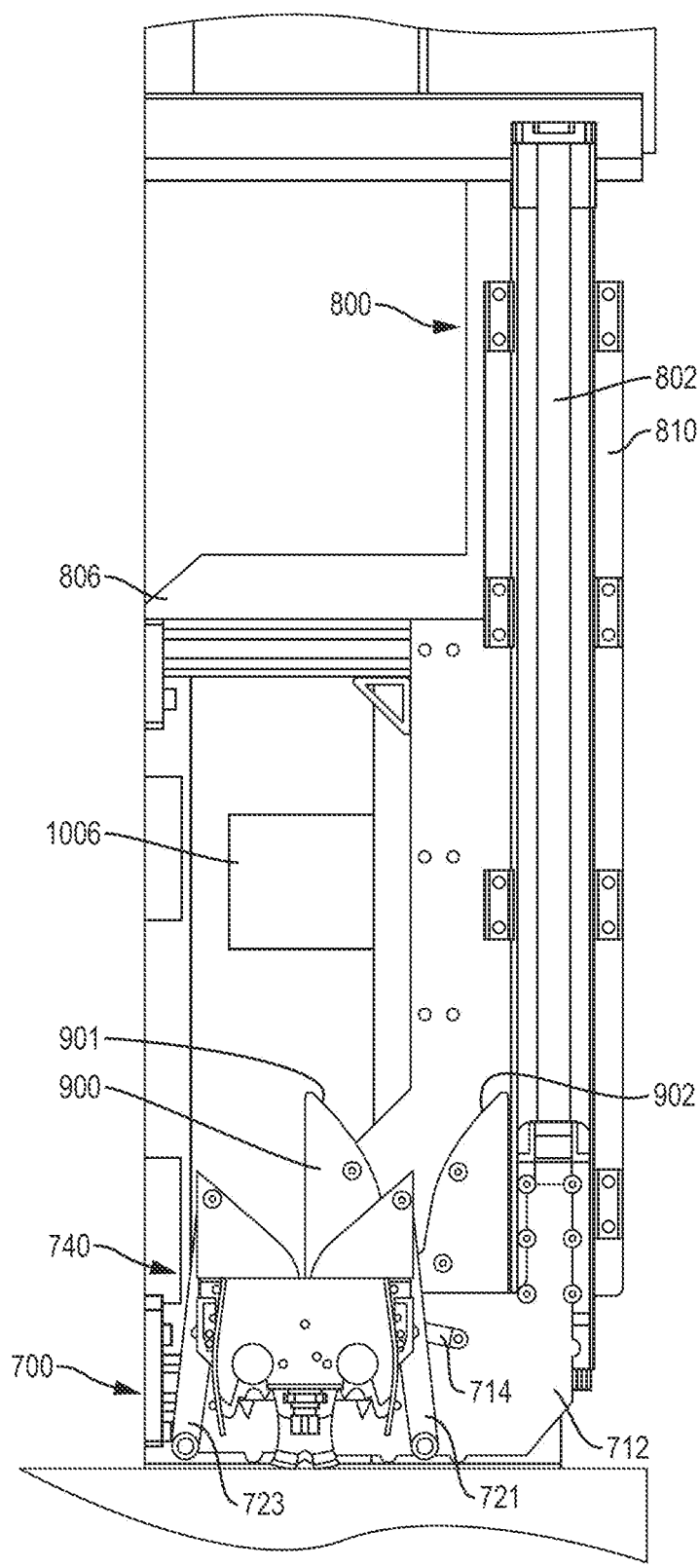
FIGS. 14A and 14B are top and perspective views, respectively, of the assembly and linear actuator of FIG. 13 mounted to a tractor.
Figure 14B:
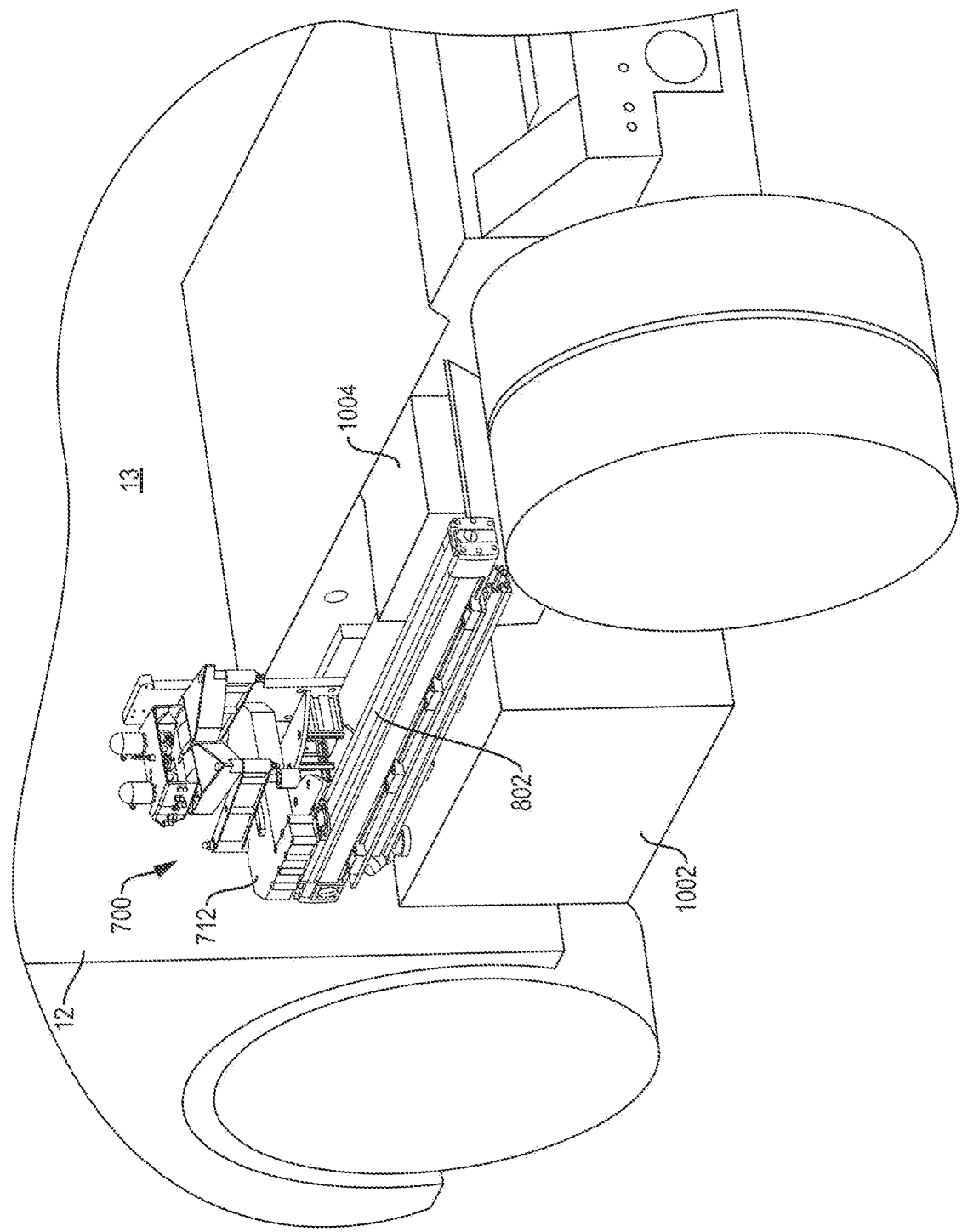

FIGS. 13 and 14A and B illustrate a non-limiting example of aspects of a tractor coupling head carrier control system that includes a single degree of freedom linear actuator 800 carried by the tractor and configured to move the tractor coupling head carrier 710 toward and away from the trailer along the longitudinal axis. In an example linear actuator 800 is a commercially-available single degree of freedom linear actuator (e.g., a Thomson Industries, Inc. linear actuator MG10BLXCJ1-01245-01676DN0000S2). Enclosure 1006 (FIG. 14B) can be used to house the controller and other electronics that operate the linear actuator and the system as a whole. Portion 713 of fixed link 712 is fixed to rail carrier 804 that is configured to be moved in both directions along rail 802, which is aligned with the Z axis. Mechanical members such as members 806, 808, and 810 fix and support the linear actuator relative to the tractor. Due to the locations of the tractor's battery 1004 and fuel tank 1002, rail 802 may be offset toward the left side of the tractor. Locating the assembly on the left side of the tractor also keeps the hose and electrical cable lengths from the trailer-side assembly to the trailer hookups short. The location of the rail and the configuration of the tractor-side carrier and the tractor coupling head establish the necessary location of the trailer coupling head on the trailer. This location can be established in one example by use of an installation fixture (not shown) that properly locates the trailer coupling frame relative to the side of the trailer, together with the design of the magnetic member and the coupling head of the trailer-side assembly.

Figure 15:
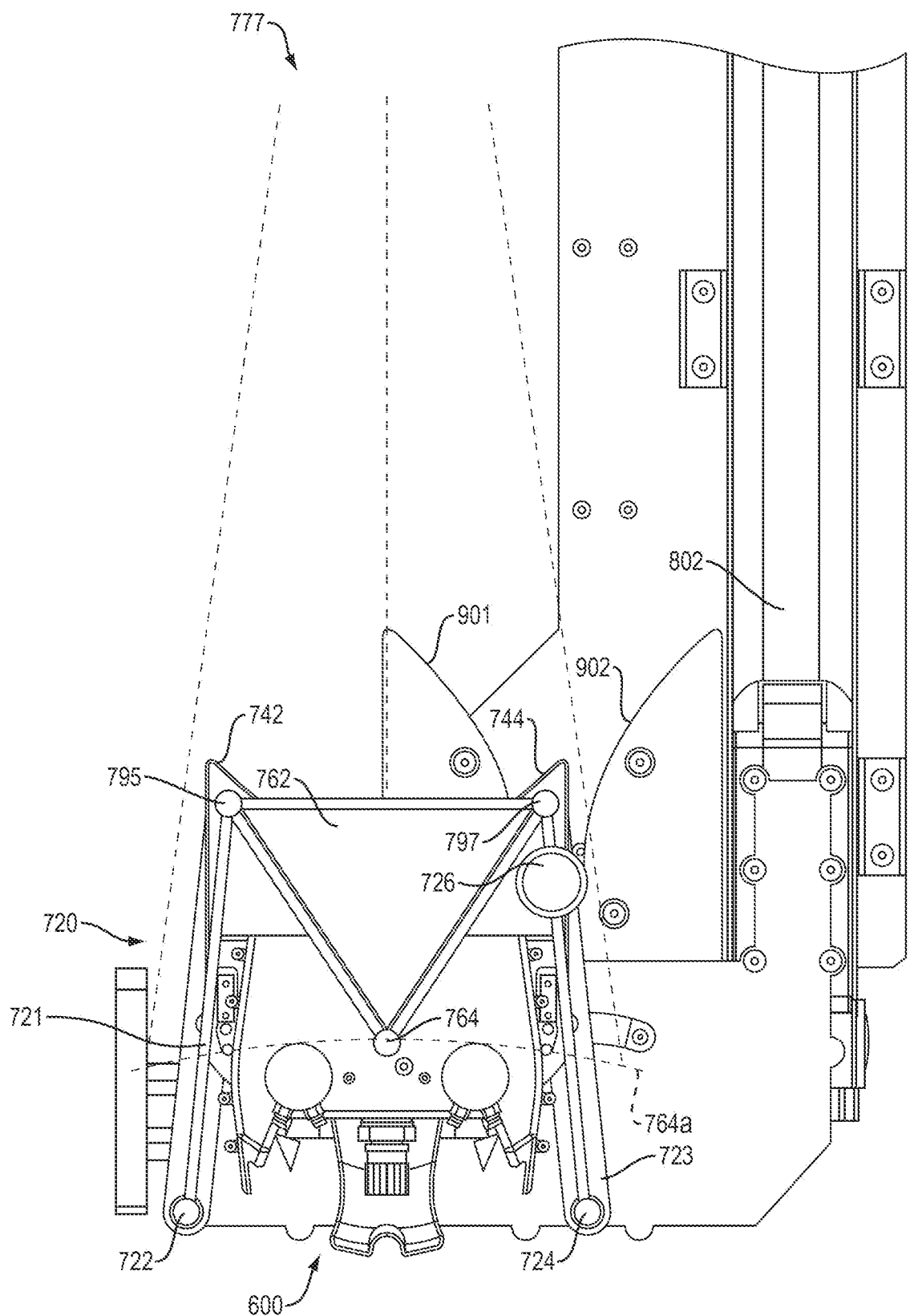
FIG. 15 is a schematic, top view that illustrates operation of the four-bar link of the tractor-side assembly of FIG. 11.

FIG. 15 schematically illustrates triangle 762 that kinematically represents the floating link 740 that is carried by pivoting links 721 and 723. Point 764 represents the face of the tractor coupling head, and arc 764a represents its allowed path of motion. The four-bar linkage is effective to maintain the face essentially perpendicular to radial lines 777 that emanate from the location of the trailer coupling head. The radial lines represent paths along which the tractor coupling head face can travel, presuming that the initial yaw angle of the trailer relative to the tractor is within +/−5 degrees of 0 degrees. Accordingly, the four-bar linkage will ensure that the tractor coupling head face is flush with the tractor coupling head face as long as the initial tractor-trailer yaw is within 5 degrees of direct alignment. Other linkages could be designed to accommodate different initial yaw angles.

Figure 16:
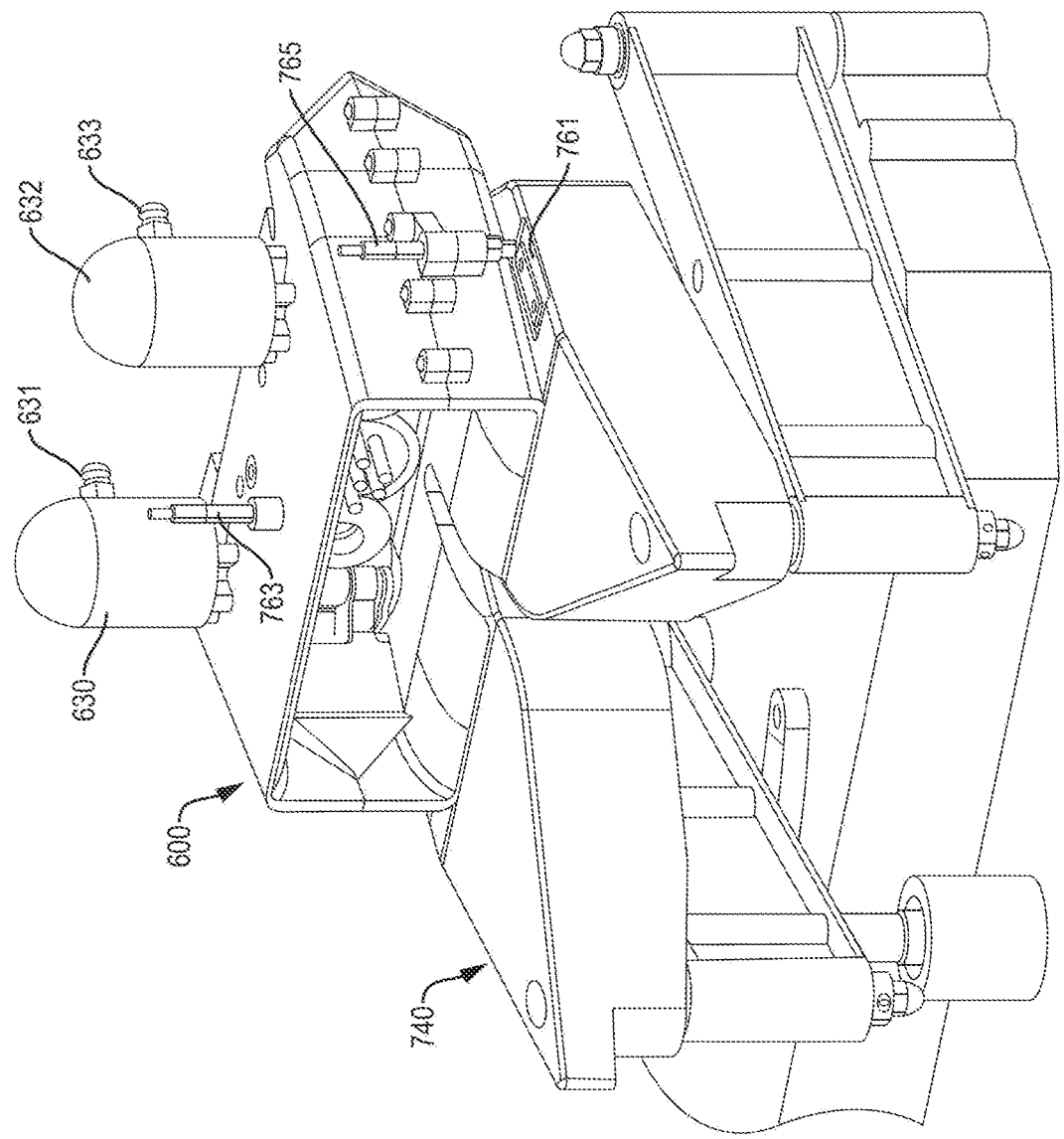
FIG. 16 is a perspective view detailing aspects of the tractor coupling head of FIG. 10.

FIG. 16 illustrates two inductive sensors 765 and 763 that are used to help properly control the tractor coupling head carrier. Sensor 765 detects both the forwardmost and rearmost edges of plate 761 attached to the top of floating link 740 and can be used when the carrier is retrieving the tractor coupling head from the trailer (see step 218, FIG. 3C). Sensor 763 detects a ferromagnetic plate (not shown) on the top of the trailer coupling head and can be used when the carrier is delivering the tractor coupling head to the trailer (see step 190, FIG. 3C). FIG. 16 also partially illustrates air-operated actuators 630 and 632 that are used to operate the clamping mechanism, which is illustrated in FIG. 17. Air connections 631 and 633 are illustrated in FIG. 16. In an example where air-operated actuators are used in the clamping mechanism, there are two separate pressurized air inputs for each actuator; one input moves the actuator in one rotary direction and the other moves it in the opposite rotary direction. Each actuator can be operated independently, or they can have a common air supply to link their motions pneumatically.

Figure 17A:
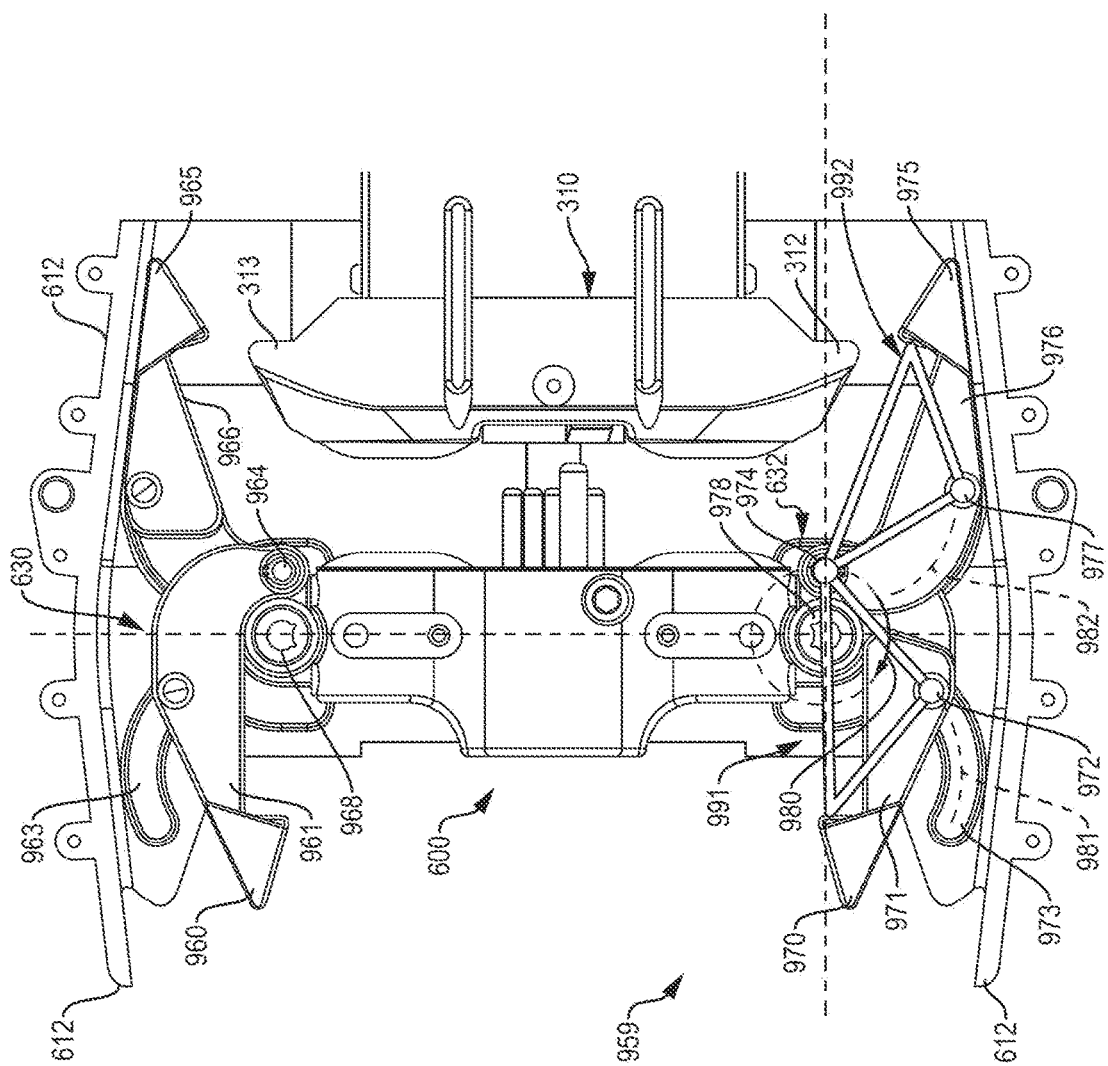
FIG. 17A is a top partial and partially schematic view of the clamping mechanism of the tractor coupling head of FIG. 10.
Figure 17B:
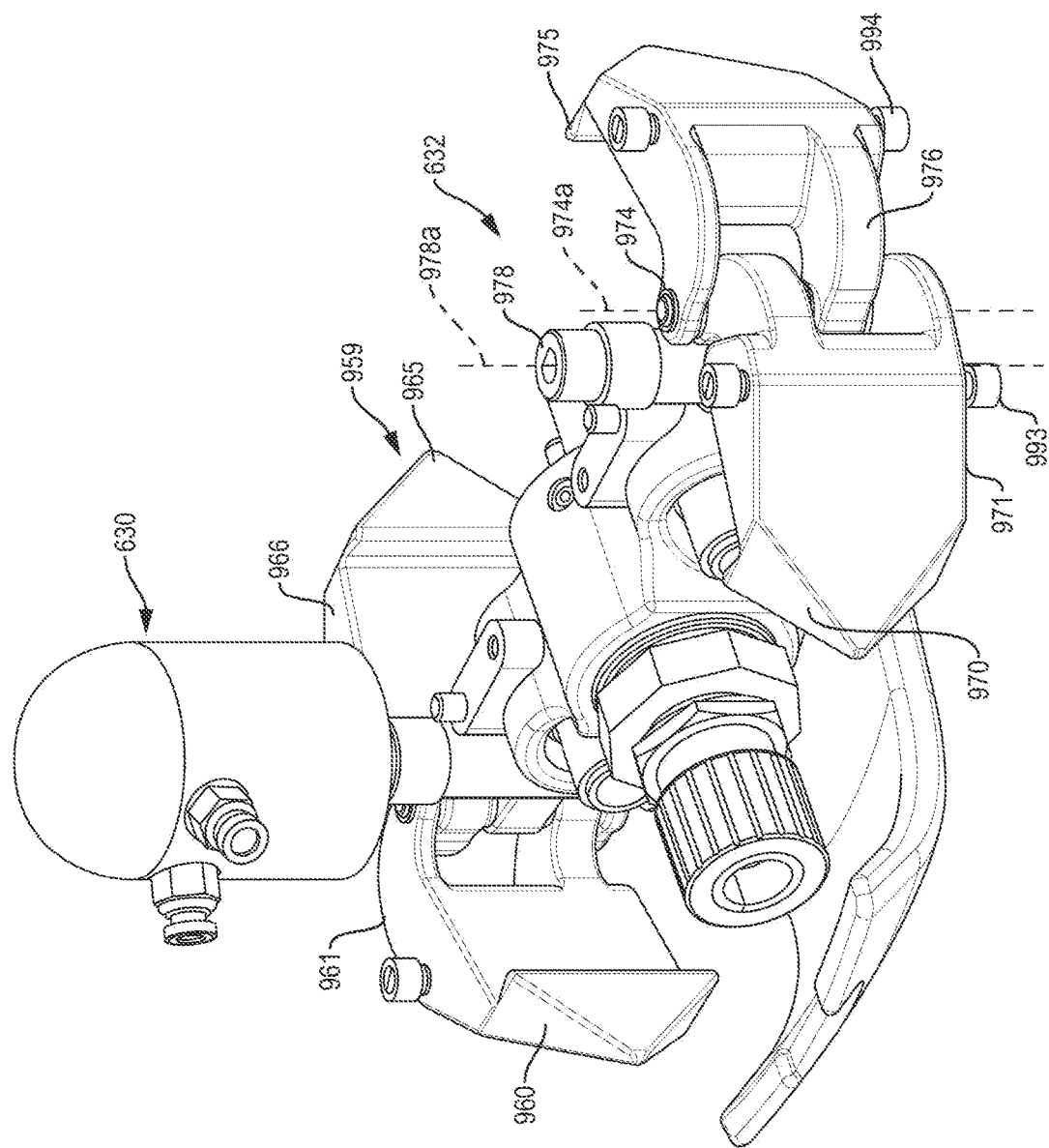
FIG. 17B is a partial perspective view of the clamping mechanism of FIG. 17B.

FIG. 17A is a top partially transparent and partially schematic view of the tractor coupling head 600 mating to the trailer coupling head 310. FIG. 17B is a rear perspective view illustrating the clamping mechanism. Clamping mechanism 959 is used to clamp the tractor coupling head to either the tractor coupling head carrier or to the trailer coupling head. A result of this clamping mechanism arrangement is that the clamping arm configuration alternately clamps to the tractor coupling head carrier and the trailer coupling head. The trailer coupling head comprises a trailer coupling head face with opposed ends; the face carries two air seals and an electrical connector between the opposed ends. The tractor coupling head comprises a tractor coupling head face with opposed ends; the face carries two air seals and an electrical connector between the opposed ends. The air seals and electrical connectors of the two faces are configured to mate together when the tractor coupling head is clamped to the trailer coupling head. The clamping arm configuration comprises two sets of clamping arms, one set proximate one end of the tractor coupling head face and the other set proximate the other end of the tractor coupling head face. Each set comprises a first arm that is configured to lock to the tractor coupling head carrier and a second arm that is configured to lock to the trailer coupling head. The clamping mechanism further comprises a motor that is configured to move at least one set of clamping arms. In the described non-limiting embodiment there are two pneumatic motors, each of which moves one set of clamping arms. Alternatively, any rotary actuator that provides sufficient torque could be used, such as an electromechanical rotary actuator.

Some details of both coupling heads are not illustrated, simply for the sake of clarity. Actuators 630 and 632 are essentially identical. Each one is configured to move a set of two clamping arms between one position where one arm engages one of posts 748 and 749 of carrier 740 (see FIG. 12) and a second position where the other arm engages a front end 312 or 313 of trailer coupling head 310. Each arm ends in a hook that is configured to sit behind and latch to the structure. For example, actuator 630 has hook 965 at the end of a first arm 966 and that is configured to engage behind end 313, and hook 960 at the end of the second arm 961 and that is configured to engage behind post 749. Actuator 632 has hook 975 at the end of a first arm 976 and that is configured to engage behind end 312, and hook 970 at the end of the second arm 971 and that is configured to engage behind post 748. In an example the four arms are identical, and in each set of arms one of the arms is flipped over relative to the other. For example, arms 971 and 976 are identical and are pivotably engaged by pin 974 such that they can both rotate about pivot axis 974a. Each of actuators 630 and 632 is configured to rotate both clockwise and counter-clockwise in accordance with compressed air provided via air input couplings (not shown in FIG. 17A). For example, actuator 632 includes rotated member 978 that rotates about axis 978a to move arms 971 and 976. Arm 971 includes pin 993 that sits in slot 973 and moves along path 981, while arm 976 includes pin 994 that sits in a separate slot (not shown) and moves along path 982. The triangles 991 and 992 represent the structures of arms 971 and 976, while arrow 980 illustrates the path of pin 974 as actuator 978 moves the arms clockwise, which will clamp hook 970 behind post 748 (not shown). In an example the crank arms of the motors move over-center when they clamp, to generate a mechanical advantage. In an example the arms are clamped to only one of the tractor coupling head carrier and the trailer coupling head at any given time. In an example, when the clamping is switched from one position to the other, for a brief time neither arm is clamped to a structure.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Functions, methods, and/or components of the methods and systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuits) (ASIC), general computing processor(s), microcontroller(s), and the like, or any combination of these, may be suitable, and may include analog or digital circuit components and/or other components with respect to any particular implementation.

Functions and components disclosed herein may operate in the digital domain, the analog domain, or a combination of the two, and certain examples include analog-to-digital converters) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system for automatically coupling at least one of an air line or an electrical line of a tractor to a trailer that is configured to be pulled by the tractor, wherein the tractor comprises a fifth wheel coupling that is configured to be coupled to a kingpin of the trailer, wherein a height of the fifth wheel coupling is adjustable, the system comprising:
    a trailer coupling head mounted to the trailer and that comprises at least one of an air line connector or an electrical connector;
    a fifth wheel coupling height control system that is configured to automatically control the height of the fifth wheel coupling when the fifth wheel coupling is coupled to the kingpin of the trailer, to control the height of the trailer coupling head;
    a tractor coupling head that comprises at least one of an air line connector that is configured to be operably coupled to the air line connector of the trailer coupling head or an electrical connector that is configured to be operably coupled to the electrical connector of the trailer coupling head;
    a tractor coupling head carrier that is configured to removably carry the tractor coupling head;
    a tractor coupling head carrier control system that is configured to move the tractor coupling head carrier toward and away from the trailer coupling head along a longitudinal axis; and
    a clamping mechanism carried by the tractor coupling head and configured to establish at least two alternative clamping states, one clamping state where the tractor coupling head is clamped to and carried by the tractor coupling head carrier such that the tractor coupling head is moved as the tractor coupling head carrier is moved, and a second clamping state where the tractor coupling head is clamped to the trailer coupling head such that the tractor coupling head carrier is free to move relative to the tractor coupling head.

2. The system of claim 1, wherein the trailer coupling head comprises mechanical features that are configured to engage with mechanical features of the tractor coupling head to provide for motions of the trailer coupling head along a vertical axis that is orthogonal to the longitudinal axis, and motions of the tractor coupling head along a transverse axis that is orthogonal to both the vertical axis and the longitudinal axis.

3. The system of claim 1, further comprising a trailer coupling frame that carries at least one extending magnetic member that is constructed and arranged to removably couple to an underside of the trailer and thereby couple the trailer coupling frame to the trailer, wherein the trailer coupling head is supported by the trailer coupling frame.

4. The system of claim 3, further comprising a flexure between the trailer coupling head and the trailer coupling frame, wherein the flexure is constructed and arranged to provide vertical compliance of the trailer coupling head relative to the trailer.

5. The system of claim 4, wherein the flexure is more compliant in one vertical direction than in the other vertical direction.

6. The system of claim 4, wherein the flexure is further constructed and arranged to provide rotational compliance of the trailer coupling head relative to the trailer about the longitudinal axis.

7. The system of claim 3, further comprising a pair of air lines and an electrical line that are coupled to the trailer coupling head, and a strain relief and support mechanism carried by the trailer coupling frame and that supports the air lines and the electrical line, wherein the strain relief and support mechanism comprises a differentially flexible support structure that is more flexible in the transverse direction than in the longitudinal direction.

8. The system of claim 1, wherein the tractor further comprises an adjustable-angle boom that carries the fifth wheel coupling, and wherein the fifth wheel coupling height control system comprises a first sensor that senses a boom angle, a second sensor that senses an angle of the fifth wheel coupling, and a controller that is configured to automatically control the height of the fifth wheel coupling based on the sensed boom angle and the sensed fifth wheel coupling angle.

9. The system of claim 1, wherein the tractor coupling head carrier comprises a linkage mechanism that is configured to allow the tractor coupling head to move along a transverse axis that is orthogonal to the longitudinal axis, and to rotate about a vertical axis that is orthogonal to both the longitudinal axis and the transverse axis.

10. The system of claim 9, wherein the linkage mechanism comprises a four-bar linkage mechanism.

11. The system of claim 10, wherein the four-bar linkage mechanism comprises a fixed link, two grounded links that are pivotably coupled to the fixed link, and a floating link that is pivotably coupled to both grounded links.

12. The system of claim 11, wherein the tractor coupling head is removably coupled to the floating link.

13. The system of claim 12, wherein the floating link comprises opposed inwardly-angled funnel surfaces that are configured to engage with a mechanical feature of the trailer coupling head to provide for motion of the tractor coupling head along the transverse axis.

14. The system of claim 12, wherein the floating link comprises opposed upwardly-angled ramp surfaces that are configured to engage with a mechanical feature of the trailer coupling head to provide for motion of the tractor coupling head along the vertical axis.

15. The system of claim 9, wherein the tractor coupling head carrier further comprises a mechanical feature that is configured to engage with a centering funnel of the tractor as the tractor coupling head carrier is moved along the longitudinal axis away from the trailer coupling head toward the tractor to a home position relative to the tractor.

16. The system of claim 1, wherein the tractor coupling head carrier control system comprises a single degree of freedom linear actuator carried by the tractor and configured to move the tractor coupling head carrier toward and away from the trailer along the longitudinal axis.

17. The system of claim 1, wherein the clamping mechanism comprises a clamping arm configuration that alternately clamps to the tractor coupling head carrier and the trailer coupling head.

18. The system of claim 17, wherein:
the trailer coupling head comprises both an air line connector and an electrical connector, and further comprises a trailer coupling head face with opposed ends and that carries two air seals and the electrical connector between the opposed ends, and the tractor coupling head comprises both an air line connector and an electrical connector, and further comprises a tractor coupling head face with opposed ends and that carries two air seals and the electrical connector between the opposed ends, wherein the air seals and electrical connectors of the two faces are configured to mate together when the tractor coupling head is clamped to the trailer coupling head;
the clamping arm configuration comprises two sets of clamping arms, one set proximate one end of the tractor coupling head face and the other set proximate the other end of the tractor coupling head face, wherein each set comprises a first arm that is configured to lock to the tractor coupling head carrier and a second arm that is configured to lock to the trailer coupling head; and
the clamping mechanism further comprises a rotary motor that is configured to move at least one of the two sets of clamping arms.

19. The system of claim 1, wherein the tractor coupling head further comprises mechanical features that are configured to engage with features of the trailer coupling head to align the tractor coupling head with the trailer coupling head by providing for motions of the trailer coupling head along a vertical axis that is orthogonal to the longitudinal axis, and motions of the tractor coupling head along a transverse axis that is orthogonal to both the vertical axis and the longitudinal axis.

20. A system for automatically coupling at least one of an air line or an electrical line of a tractor to a trailer that is configured to be pulled by the tractor, wherein the tractor comprises a fifth wheel coupling that is configured to be coupled to a kingpin of the trailer and an adjustable-angle boom that carries the fifth wheel coupling, wherein a height of the fifth wheel coupling is adjustable, the system comprising:
a trailer coupling head mounted to the trailer and that comprises at least one of an air line connector or an electrical connector;
a trailer coupling frame that carries at least one extending magnetic member that is constructed and arranged to removably couple to an underside of the trailer and thereby couple the trailer coupling frame to the trailer, wherein the trailer coupling head is supported by the trailer coupling frame;
a flexure between the trailer coupling head and the trailer coupling frame, wherein the flexure is constructed and arranged to provide vertical compliance of the trailer coupling head relative to the trailer, wherein the flexure is more compliant in one vertical direction than in the other vertical direction, and wherein the flexure is further constructed and arranged to provide rotational compliance of the trailer coupling head relative to the trailer about a longitudinal axis;
a fifth wheel coupling height control system that is configured to automatically control the height of the fifth wheel coupling when the fifth wheel coupling is coupled to the kingpin of the trailer, to control the height of the trailer coupling head, and comprises a first sensor that senses a boom angle, a second sensor that senses an angle of the fifth wheel coupling, and a controller that is configured to automatically control the height of the fifth wheel coupling based on the sensed boom angle and the sensed fifth wheel coupling angle;

a tractor coupling head that comprises at least one of an air line connector that is configured to be operably coupled to the air line connector of the trailer coupling head or the electrical connector that is configured to be operably coupled to an electrical connector of the trailer coupling head;

wherein the trailer coupling head comprises mechanical features that are configured to engage with mechanical features of the tractor coupling head to provide for motions of the trailer coupling head along a vertical axis that is orthogonal to the longitudinal axis, and motions of the tractor coupling head along a transverse axis that is orthogonal to both the vertical axis and the longitudinal axis;

a tractor coupling head carrier that is configured to removably carry the tractor coupling head and comprises a four-bar linkage mechanism that is configured to allow the tractor coupling head to move along the transverse axis, and to rotate about the vertical axis, and comprises a fixed link, two grounded links that are pivotably coupled to the fixed link, and a floating link that is pivotably coupled to both grounded links, wherein the tractor coupling head is removably coupled to the floating link, wherein the floating link comprises opposed inwardly-angled funnel surfaces that are configured to engage with one of the mechanical features of the trailer coupling head to provide for motion of the tractor coupling head along the transverse axis, wherein the floating link comprises opposed upwardly-angled ramp surfaces that are configured to engage with one of the mechanical features of the trailer coupling head to provide for motion of the trailer coupling head along the vertical axis, wherein the tractor coupling head carrier further comprises a mechanical feature that is configured to engage with a centering funnel of the tractor as the tractor coupling head carrier is moved along the longitudinal axis away from the trailer coupling head toward the tractor to a home position relative to the tractor;

a tractor coupling head carrier control system that is configured to move the tractor coupling head carrier toward and away from the trailer coupling head along the longitudinal axis and comprises a single degree of freedom linear actuator carried by the tractor and configured to move the tractor coupling head carrier toward and away from the trailer along the longitudinal axis; and a clamping mechanism carried by the tractor coupling head and configured to establish at least two alternative clamping states, one clamping state where the tractor coupling head is clamped to and carried by the tractor coupling head carrier such that the tractor coupling head is moved as the tractor coupling head carrier is moved, and a second clamping state where the tractor coupling head is clamped to the trailer coupling head such that the tractor coupling head carrier is free to move relative to the tractor coupling head, wherein the clamping mechanism comprises a clamping arm configuration that alternately clamps to the tractor coupling head carrier and the trailer coupling head.

* * * * *